(12) United States Patent
Geng et al.

(10) Patent No.: US 12,517,389 B2
(45) Date of Patent: Jan. 6, 2026

(54) DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Yuxu Geng, Beijing (CN); Lan Xin, Beijing (CN); Sijun Lei, Beijing (CN); Yansheng Sun, Beijing (CN); Zhe Li, Beijing (CN); Yong Deng, Beijing (CN); Hebing Ma, Beijing (CN); Song Liu, Beijing (CN); Longbo Huang, Beijing (CN); Xiaozhen Fan, Beijing (CN); Yuan Xia, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 87 days.

(21) Appl. No.: 18/044,113

(22) PCT Filed: Mar. 31, 2022

(86) PCT No.: PCT/CN2022/084416
§ 371 (c)(1),
(2) Date: Mar. 6, 2023

(87) PCT Pub. No.: WO2023/184341
PCT Pub. Date: Oct. 5, 2023

(65) Prior Publication Data
US 2024/0302684 A1    Sep. 12, 2024

(51) Int. Cl.
*G02F 1/13*   (2006.01)
*G02F 1/1343*  (2006.01)
(Continued)

(52) U.S. Cl.
CPC ...... *G02F 1/1323* (2013.01); *G02F 1/134309* (2013.01); *G02F 1/13471* (2013.01); *G02F 1/19* (2013.01)

(58) Field of Classification Search
None
See application file for complete search history.

(56) References Cited

U.S. PATENT DOCUMENTS 10,627,664 B2   4/2020  Li et al.
11,287,688 B2   3/2022  Chiu et al.
(Continued)

FOREIGN PATENT DOCUMENTS

CN   2715193 Y       8/2005
CN   103185982 A  *  7/2013
(Continued)

*Primary Examiner* — Shan Liu
(74) *Attorney, Agent, or Firm* — Frank Gao, Esq.

(57) ABSTRACT

A display device is provided. The display device includes a display panel and a light modulation portion which are stacked. The light modulation portion includes a first substrate, a refractive index variable material layer, a light modulation microstructure, an electrode layer and a second substrate which are stacked, and the refractive index variable material layer, the light modulation microstructure and the electrode layer are all located between the first substrate and the second substrate; the electrode layer includes at least one electrode layer, the at least one electrode layer includes electrodes located in a same layer and separated from each other, and the light modulation microstructure and the electrode layer are located at both sides of the refractive index variable material layer respectively, or both the light (Continued)

modulation microstructure and the electrode layer are located at a same side of the refractive index variable material layer.

10 Claims, 13 Drawing Sheets

(51) Int. Cl.
  *G02F 1/1347* (2006.01)
  *G02F 1/19* (2019.01)

(56) References Cited

U.S. PATENT DOCUMENTS

| | | | |
|---|---|---|---|
| 2008/0284715 A1 | 11/2008 | Kawata | |
| 2010/0007818 A1* | 1/2010 | Saitoh | G02B 5/045 |
| | | | 362/606 |
| 2011/0075074 A1* | 3/2011 | Gauza | G02F 1/134363 |
| | | | 252/299.61 |
| 2015/0085088 A1* | 3/2015 | Asai | H04N 13/317 |
| | | | 348/54 |
| 2016/0065950 A1* | 3/2016 | Quan | G02F 1/1339 |
| | | | 348/51 |
| 2016/0275875 A1 | 9/2016 | Wei | |
| 2016/0301918 A1* | 10/2016 | Mukhtarov | G02B 30/30 |
| 2017/0153503 A1* | 6/2017 | Tang | G02F 1/137 |
| 2019/0033632 A1* | 1/2019 | Lee | G09G 3/36 |
| 2019/0265521 A1 | 8/2019 | Liang et al. | |
| 2020/0089384 A1 | 3/2020 | Wang et al. | |
| 2021/0255491 A1 | 8/2021 | Chen et al. | |
| 2021/0271132 A1* | 9/2021 | Chiu | G02F 1/133528 |
| 2022/0155631 A1* | 5/2022 | Xin | B60K 35/22 |
| 2023/0185145 A1* | 6/2023 | Deng | G02F 1/137 |
| | | | 349/33 |

FOREIGN PATENT DOCUMENTS

| | | | |
|---|---|---|---|
| CN | 104732168 A | | 6/2015 |
| CN | 106569365 A | | 4/2017 |
| CN | 107102460 A | | 8/2017 |
| CN | 107229145 A | | 10/2017 |
| CN | 106249979 B | | 5/2019 |
| CN | 107632451 B | | 5/2020 |
| CN | 210465919 U | | 5/2020 |
| CN | 111679464 A | | 9/2020 |
| CN | 211454155 U | | 9/2020 |
| CN | 111812768 A | | 10/2020 |
| CN | 112099261 A | | 12/2020 |
| CN | 212255969 U | * | 12/2020 |
| CN | 112363334 A | | 2/2021 |
| CN | 112987388 A | | 6/2021 |
| CN | 113126339 A | | 7/2021 |
| CN | 113835247 A | | 12/2021 |
| CN | 215264292 U | | 12/2021 |
| EP | 4 092 478 A1 | | 11/2022 |
| JP | 2009020259 A | | 1/2009 |
| JP | 2018159849 A | | 10/2018 |

* cited by examiner

DISPLAY DEVICE

TECHNICAL FIELD

At least one embodiment of the present disclosure relates to a display device.

BACKGROUND

At present, with the popularization of mobile office forms in public places, people pay more and more attention to improving information security, and gradually adopt display products with peep-proof function to reduce the risk of information leakage. Among the products with peep-proof function, the display products with one-button switching between a sharing state and a peep-proof state can meet people's application needs in various scenarios.

SUMMARY

Embodiments of the present disclosure provides a display device. The display device includes: a display panel; a light modulation portion, disposed in a stacked manner with the display panel. The light modulation portion includes a first substrate, a refractive index variable material layer, a light modulation microstructure, an electrode layer and a second substrate which are stacked, and the refractive index variable material layer, the light modulation microstructure and the electrode layer are all located between the first substrate and the second substrate; the electrode layer includes at least one electrode layer, the at least one electrode layer includes a plurality of electrodes located in a same layer and separated from each other, and the light modulation microstructure and the electrode layer are located at both sides of the refractive index variable material layer respectively, or both the light modulation microstructure and the electrode layer are located at a same side of the refractive index variable material layer.

For example, according to embodiments of the present disclosure, the refractive index variable material layer includes a liquid crystal layer, a refractive index of liquid crystal in the liquid crystal layer is configured to change between a first refractive index and a second refractive index, and a refractive index of the light modulation microstructure is equal to one of the first refractive index and the second refractive index.

For example, according to embodiments of the present disclosure, one of the light modulation microstructure and the electrode layer is located at a light exiting side of the refractive index variable material layer, and the other of the light modulation microstructure and the electrode layer is located at a light incident side of the refractive index variable material layer.

For example, according to embodiments of the present disclosure, the light modulation microstructure includes a plurality of light modulation columns extending along a first direction and arranged along a second direction, the plurality of electrodes include a plurality of first electrodes, the electrode layer further includes a plurality of second electrodes, the plurality of first electrodes and the plurality of second electrodes are alternately arranged along the second direction, the plurality of first electrodes and the plurality of second electrodes are configured to input different voltages, and the first direction is intersected with the second direction.

For example, according to embodiments of the present disclosure, the light modulation microstructure includes a plurality of light modulation columns extending along a first direction and arranged along a second direction, the plurality of electrodes include a plurality of first electrodes, the electrode layer further includes a plurality of second electrodes, the plurality of first electrodes and the plurality of second electrodes are alternately arranged, an arrangement direction of the plurality of first electrodes and the plurality of second electrodes is intersected with the second direction, the plurality of first electrodes and the plurality of second electrodes are configured to input different voltages, and the first direction is intersected with the second direction.

For example, according to embodiments of the present disclosure, the electrode layer includes a first electrode layer and a second electrode layer, one of the first electrode layer and the second electrode layer is located at one side of the light modulation microstructure away from the refractive index variable material layer, and the other of the first electrode layer and the second electrode layer is located at one side of the refractive index variable material layer away from the light modulation microstructure, at least one of the first electrode layer and the second electrode layer includes the plurality of electrodes located in the same layer and separated from each other, and the first electrode layer and the second electrode layer are configured to input different voltages.

For example, according to embodiments of the present disclosure, the plurality of electrodes include a plurality of first electrodes, the first electrode layer includes the plurality of first electrodes, the second electrode layer includes a plurality of second electrodes separated from each other, and an arrangement direction of the plurality of first electrodes is intersected with an arrangement direction of the plurality of second electrodes.

For example, according to embodiments of the present disclosure, the light modulation microstructure includes a plurality of light modulation columns extending along a first direction and arranged along a second direction, and the first direction is intersected with the second direction; and the plurality of first electrodes are arranged along one of the first direction and the second direction, and the plurality of second electrodes are arranged along the other of the first direction and the second direction.

For example, according to embodiments of the present disclosure, the plurality of electrodes include a plurality of first electrodes, the first electrode layer includes the plurality of first electrodes, the second electrode layer includes a plurality of second electrodes separated from each other, and an arrangement direction of the plurality of first electrodes is the same as an arrangement direction of the plurality of second electrodes, and at least part of an orthographic projection of the second electrodes on the first electrode layer does not overlap with the first electrodes.

For example, according to embodiments of the present disclosure, the light modulation microstructure includes a plurality of light modulation columns extending along a first direction and arranged along a second direction, and the first direction is intersected with the second direction; and the plurality of first electrodes are arranged along one of the first direction and the second direction.

For example, according to embodiments of the present disclosure, shapes of at least certain electrodes among the plurality of first electrodes and the plurality of second electrodes include a straight line shape, a folded line shape or a wavy line shape.

For example, according to embodiments of the present disclosure, the plurality of light modulation columns are densely arranged.

For example, according to embodiments of the present disclosure, a cross section of at least one light modulation column, which is taken by a plane parallel to the second direction and perpendicular to the first substrate, includes a triangular shape, a trapezoidal shape, or an arc shape, and along a direction pointing from a center of the light modulation microstructure to a center of the refractive index variable material layer, a size of the cross section in a direction parallel to the first substrate gradually decreases.

For example, according to embodiments of the present disclosure, the light modulation microstructure includes a plurality of light modulation blocks arranged in an array along a first direction and a second direction; the plurality of electrodes include a plurality of first electrodes, the electrode layer further includes a plurality of second electrodes, the plurality of first electrodes and the plurality of second electrodes are alternately arranged along the first direction or the second direction, and the plurality of first electrodes and the plurality of second electrodes are configured to input different voltages.

For example, according to embodiments of the present disclosure, the light modulation microstructure includes a plurality of light modulation blocks arranged in an array along a first direction and a second direction; the electrode layer includes a first electrode layer and a second electrode layer, one of the first electrode layer and the second electrode layer is located at one side of the light modulation microstructure away from the refractive index variable material layer, the other of the first electrode layer and the second electrode layer is located at one side of the refractive index variable material layer away from the light modulation microstructure, at least one of the first electrode layer and the second electrode layer includes the plurality of electrodes located in the same layer and separated from each other, and the first electrode layer and the second electrode layer are configured to input different voltages.

For example, according to embodiments of the present disclosure, the display panel includes a display surface, a shape of the display surface includes a rectangular shape, and the rectangular shape includes two sides extending along the first direction and two sides extending along the second direction.

For example, according to embodiments of the present disclosure, the display panel is located at a light exiting side of the light modulation portion, and the display panel includes a liquid crystal display panel; the display panel includes a display surface, a shape of the display surface includes a rectangular shape, and the rectangular shape includes two sides extending along a third direction and two sides extending along a fourth direction; and the display device further includes a peep-proof structure located at a light incident side of the light modulation portion, the peep-proof structure includes a plurality of strip-shaped portions arranged in parallel, and an included angle between an extending direction of each strip-shaped portion of the plurality of strip-shaped portions and the third direction is in a range of 5-50 degrees.

For example, according to embodiments of the present disclosure, the sides extending along the third direction are short sides of the display surface.

For example, according to embodiments of the present disclosure, the display panel is located at a light incident side of the light modulation portion, and the display panel includes an organic light emitting diode display panel or a liquid crystal display panel.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

In research, the inventors of the present application have noticed that in the existing display products with a peep-proof function on the market, taking that the image displayed on the display surface is viewed by human eye at an angle of 45 degrees relative to the normal of the display surface as an example, when the display products are in a sharing state, the brightness of the image light received by the human eyes does not exceed 2% of the brightness of the image light received in the normal direction, and the display brightness in the sharing state is low, which affects the viewing experience of users.

Figure 1:
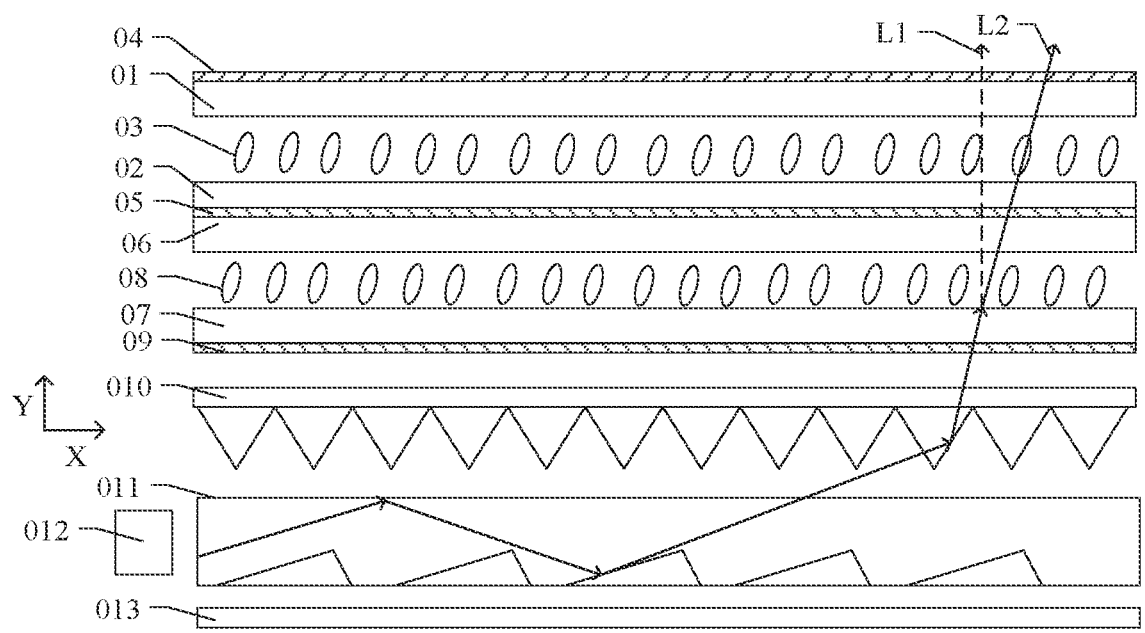
FIG. 1 is a schematic diagram of switching between a peep-proof state and a sharing state of a display device.
Figure 2:
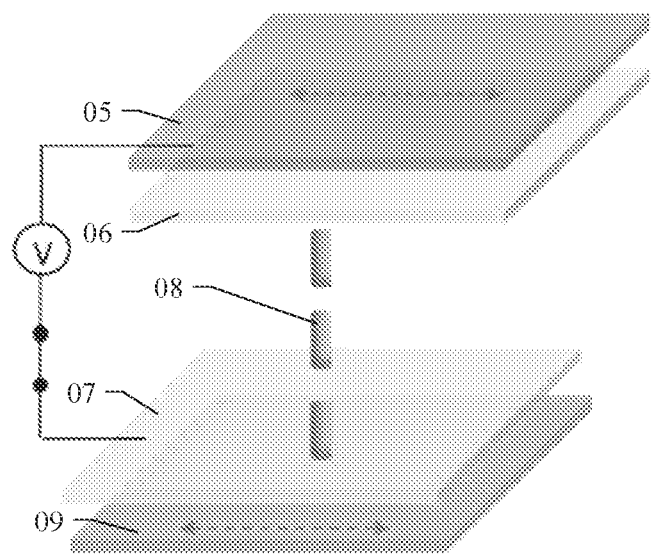
FIGS. 2 and 3 are schematic diagrams of a principle of switching between a peep-proof state and a sharing state adopted by the display device shown in FIG. 1.
Figure 3:
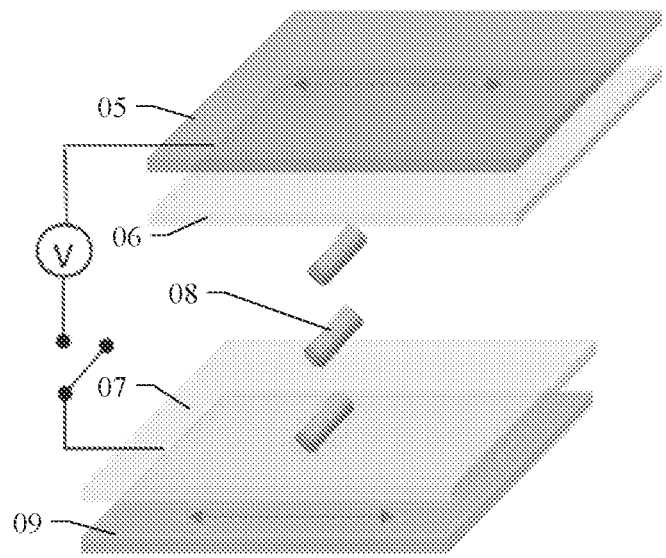

FIG. 1 is a schematic diagram of switching between a peep-proof state and a sharing state of a display device, and FIGS. 2 and 3 are schematic diagrams of a principle of switching between a peep-proof state and a sharing state adopted by the display device shown in FIG. 1. As shown in FIGS. 1-3, the display device includes a display panel, a peep-proof panel and a backlight which are stacked, and the peep-proof panel is located between the display panel and the backlight. For example, the display panel and the peep-proof panel are stacked in the Y direction. The display panel includes a first substrate 01 and a second substrate 02 which are stacked, and a first liquid crystal layer 03 is disposed between the first substrate 01 and the second substrate 02. A first electrode layer is disposed between the first substrate 01 and the first liquid crystal layer 03, and a second electrode layer is disposed between the second substrate 02 and the first liquid crystal layer 03. In the case where a voltage is input, the first electrode layer and the second electrode layer drive the liquid crystal in the first liquid crystal layer 03 to rotate. The display panel further includes a first polarizing layer 04 disposed at a side of the first substrate 01 away from the second substrate 02 and a second polarizing layer 05 disposed at a side of the second substrate 02 away from the first substrate 01. The polarization direction of the first polarizing layer 04 is intersected with the polarization direction of the second polarizing layer 05, and the polarization direction of polarized light exited through the first polarizing layer 04 is intersected with the polarization direction of polarized light exited through the second polarizing layer 05. For example, the display panel can also be disposed between the peep-proof panel and the backlight, which is not limited here. For example, the first electrode layer and the second electrode layer of the display panel can be disposed at one side of the same substrate of the display panel, and for example, can be both disposed at one side of the second substrate or the first substrate.

As shown in FIGS. 1-3, the peep-proof panel includes a third substrate 06 and a fourth substrate 07 which are stacked, and a second liquid crystal layer 08 is disposed between the third substrate 06 and the fourth substrate 07. A third electrode layer is disposed between the third substrate 06 and the second liquid crystal layer 08, and a fourth electrode layer is disposed between the fourth substrate 07 and the second liquid crystal layer 08. In the case where a voltage is input, the third electrode layer and the fourth electrode layer drive the liquid crystal in the second liquid crystal layer 08 to rotate. A third polarizing layer 09 is disposed at a side of the fourth substrate 07 away from the second liquid crystal layer 08, and the polarization direction of the third polarizing layer 09 is the same as the polarization direction of the second polarizing layer 05.

As shown in FIGS. 1-3, the backlight includes a light source 012, an uniform light layer 010, a light guide plate 011 and a reflective layer 013. The light emitted by the light source 012 enters the light guide plate 011 and propagates in the light guide plate 011 to play an uniform light role. The light exited from the light guide plate 011 to the reflective layer 013 can be reflected by the reflective layer 013 back to the light guide plate 011 to improve the utilization rate of light. The light exited from the light guide plate 011 to the uniform light layer 010 is diffused by the uniform light layer 010 to achieve further light equalizing effect, and is propagated to the peep-proof panel. For example, the uniform light layer 010 includes an optical film such as a prism sheet.

As shown in FIG. 3, in the case where no voltage is input to the third electrode layer and the fourth electrode layer located between the third substrate 06 and the fourth substrate 07 in the peep-proof panel, the liquid crystal in the second liquid crystal layer 08 does not rotate, and the light emitted from the backlight and passing through the peep-proof panel basically does not deflect, and passes through the third polarization layer and the second polarization layer with the same polarization direction. In this case, the light L2 is emitted from the display panel, and the display device is in a sharing state.

As shown in FIG. 2, in the case where a voltage is input to the third electrode layer and the fourth electrode layer located between the third substrate 06 and the fourth substrate 07 in the peep-proof panel, the liquid crystal in the second liquid crystal layer 08 rotates. In this case, the light passing through the third polarization layer from the backlight enters the liquid crystal box, and because of the deflection of the liquid crystal, the polarization state of the light at the front viewing angle remains unchanged and is exited from the second polarization layer, and the polarization state of the light at a large viewing angle becomes circularly polarized and then filtered by the second polarization layer. And in this case, the light L1 is emitted from the display panel, and the display device is in a peep-proof state.

The emergent light L1 in the peep-proof state deflects toward the center of the display panel relative to the emergent light L2 in the sharing state, thereby narrowing the viewing angle.

In the switching mode between the peep-proof state and the sharing state, the peep-proof state can make the observer from a side viewing angle unable to clearly see the display content of the display panel, and in the sharing state, the brightness of the display content of the display panel viewed by the observer from the side viewing angle will also be reduced due to the filtering effect of the third polarizing layer and the second polarizing layer.

In the present disclosure (including various embodiments described later), the "peep-proof state" means that the light intensity of the image light emitted from the display panel is concentrated at the viewing angle within 45 degrees from the normal line of the display surface of the display panel, and when the included angle between the viewer's eyes and the normal line is greater than 45 degrees, the image displayed on the display surface is basically unclear. Therefore, the "peep-proof state" can refer to a state of preventing others from peeking at information, which can better protect the privacy of users and prevent the leakage of information.

In the present disclosure (including various embodiments described later), the "sharing state" has a light divergent effect compared with the "peep-proof state". For example, the light intensity of the image light emitted from the display panel is not concentrated at the viewing angle within 45 degrees from the normal line of the display surface, and when the included angle between the viewer's eyes and the normal line is greater than 45 degrees, the image displayed on the display surface can still be clearly seen. Therefore, the "sharing state" can refer to a state of sharing information with others, which can realize that many people watch the image displayed on the display device at the same time.

Figure 4:
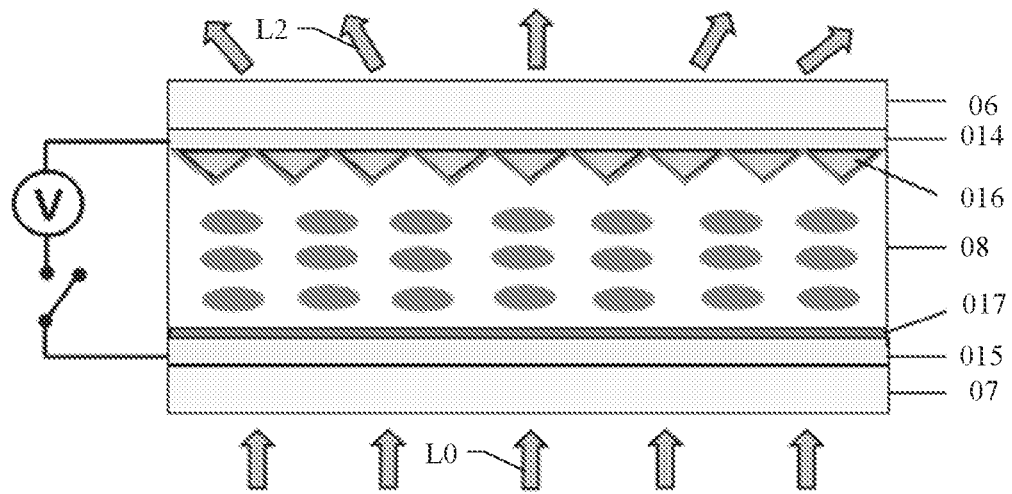
FIGS. 4 and 5 are schematic diagrams of another principle of switching between a peep-proof state and a sharing state adopted by the display device shown in FIG. 1.
Figure 5:
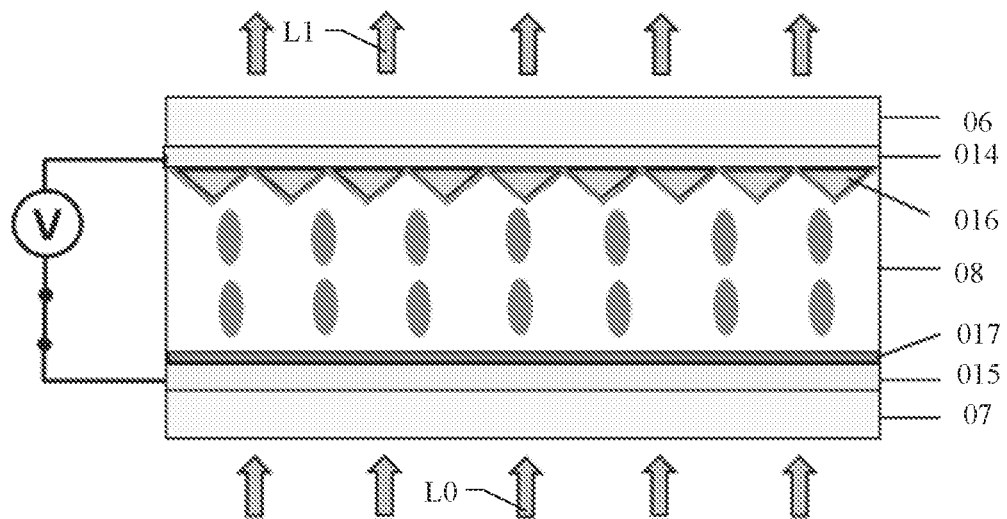

FIGS. 4 and 5 are schematic diagrams of another principle of switching between a peep-proof state and a sharing state adopted by the display device shown in FIG. 1. As shown in FIGS. 4 and 5, a third electrode layer 014 is disposed at one side of the third substrate 06 facing the second liquid crystal layer 08, a prism microstructure 016 is disposed between the third electrode layer 014 and the second liquid crystal layer 08, and an alignment film is disposed at one side of the prism microstructure 016 facing the second liquid crystal layer 08. A fourth electrode layer 015 is provided at one side of the fourth substrate 07 facing the second liquid crystal layer 08, and an alignment film 017 is provided at one side of the fourth electrode layer 015 facing the second liquid crystal layer 08. Both the third electrode layer 014 and the fourth electrode layer 015 are whole-surface electrode layers.

The liquid crystal molecules in the second liquid crystal layer 08 are anisotropic. For example, most of the liquid crystal molecules are formed by rod-like or disk-like molecules, and the physical properties in a direction parallel to the long axis of the molecules are different from the physical properties in a direction perpendicular to the long axis of the molecules. The liquid crystal molecules are also referred to as anisotropic crystals. For example, in terms of smectic liquid crystal and nematic liquid crystal, etc., liquid crystal molecules thereof are rod-shaped and have two refractive indexes, namely, the refractive index in the direction perpendicular to the long axis and the refractive index in the direction parallel to the long axis. When light enters the liquid crystal layer, it will be affected by the two refractive indexes of the liquid crystal.

As shown in FIG. 4, the liquid crystal in the second liquid crystal layer 08 has a birefringence property. In the case where no voltage is applied to the second liquid crystal layer 08, the liquid crystal in the second liquid crystal layer 08 is in a horizontal state with a refractive index n1. In this case, the refractive index n0 of the prism microstructure 016 is different from the refractive index n1 of the second liquid crystal layer 08, and the light L0 emitted from the backlight will be refracted and/or scattered when entering the second liquid crystal layer 08 and the prism microstructure 016. That is, the refractive index of the prism microstructure is inconsistent with at least one refractive index parameter of the liquid crystal, which has the effect of dispersing light, and therefore, the light L2 exited after passing through the peep-proof panel is in a divergent state, and the display device is in a sharing state.

As shown in FIG. 5, the liquid crystal in the second liquid crystal layer 08 has a birefringence property. In the case where a voltage is applied to the second liquid crystal layer 08, the liquid crystal in the second liquid crystal layer 08 rotates gradually, and the refractive index changes gradually. In the case where a certain voltage (e.g., ±12 V) is applied, the refractive index of the liquid crystal is n2. In this case, the refractive index n0 of the prism microstructure 016 is the same as the refractive index n2 of the second liquid crystal layer 08. The light L0 emitted from the backlight will not be refracted or scattered when entering the second liquid crystal layer 08 and the prism microstructure 016, and therefore, the angle of the light L1 exited after passing through the peep-proof panel is basically equal to the angle of the incident light L0, and the display device is in a peep-proof state.

In the switching mode between the peep-proof state and the sharing state, because the light is further dispersed, display in the sharing state is excellent. That is, in the sharing state, the brightness of the display content of the display panel viewed by the observer from the side viewing angle is higher.

The embodiment of the present disclosure provides a display device. The display device includes a display panel and a light modulation portion which are stacked. The light modulation portion includes a first substrate, a refractive index variable material layer, a light modulation microstructure, an electrode layer and a second substrate which are stacked, and the refractive index variable material layer, the light modulation microstructure and the electrode layer are all located between the first substrate and the second substrate; the electrode layer includes at least one electrode layer, the at least one electrode layer comprises a plurality of electrodes located in a same layer and separated from each other, and the light modulation microstructure and the electrode layer are located at both sides of the refractive index variable material layer respectively, or both the light modulation microstructure and the electrode layer are located at a same side of the refractive index variable material layer. The plurality of electrodes located in the same layer and separated from each other, and the light modulation microstructure are provided in the embodiment of the present disclosure, which is helpful to reduce the required driving voltage when the display device is in a sharing state, and further reduce the driving power consumption of the display device.

The display device provided by the embodiment of the present disclosure will be described below with reference to the accompanying drawings.

Figure 6:
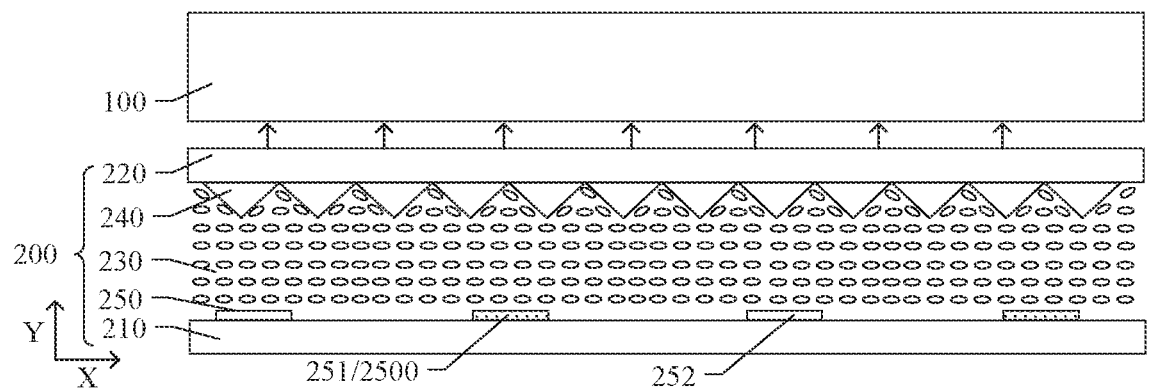
FIG. 6 is a partial cross-sectional structural view of a display device provided by an example of an embodiment of the present disclosure.
Figure 7:
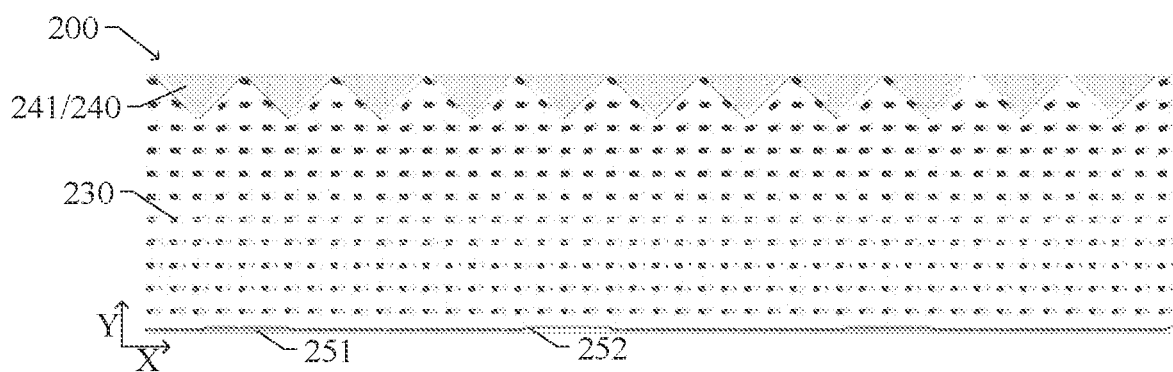
FIGS. 7 and 8 are simulation diagrams of a light modulation portion in the display device shown in FIG. 6 under the condition of whether power is on or off, respectively.
Figure 8:
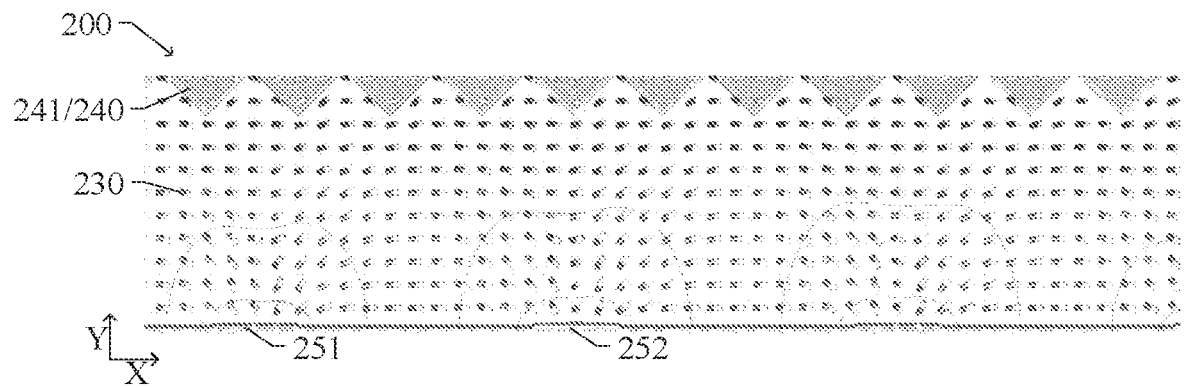

FIG. 6 is a partial cross-sectional structural view of a display device provided by an example of an embodiment of the present disclosure, and FIGS. 7 and 8 are simulation diagrams of a light modulation portion in the display device shown in FIG. 6 under the condition of whether power is on or off, respectively. As shown in FIG. 6, the display device includes a display panel 100 and a light modulation portion 200 which are stacked. For example, the display panel 100 and the light modulation portion 200 are stacked in the Y direction. As shown in FIG. 6, the light modulation portion 200 includes a first substrate 210, a refractive index variable material layer 230, a light modulation microstructure 240, an electrode layer 250 and a second substrate 220 which are stacked, and the refractive index variable material layer 230, the light modulation microstructure 240 and the electrode layer 250 are all located between the first substrate 210 and the second substrate 220.

For example, the first substrate 210 and the second substrate 220 are both light-transmitting substrates made of light-transmitting materials. For example, the materials of the first substrate 210 and the second substrate 220 can be glass, organic polymer or any other transparent material. For example, the electrode layer 250 can be a light-transmitting electrode layer, and for example, the material of the electrode layer 250 can be a transparent conductive material, such as indium tin oxide (ITO), etc.

As shown in FIG. 6, the electrode layer 250 includes at least one individual electrode layer, and the at least one individual electrode layer includes a plurality of electrodes 2500 located in the same layer and separated from each other. For example, the electrodes included in the at least one individual electrode layer are not formed as a whole-layered electrode or a whole-surface electrode.

For example, the "same layer" can refer to a layer structure formed by performing one-time patterning process using the same mask on a film layer which is formed by the same film forming process and used for producing specific patterns. That is, the one-time patterning process corresponds to one mask. According to different specific patterns, the one-time patterning process can include multiple times of exposure, development or etching processes, the specific patterns in the formed layer structure can be continuous or discontinuous, and the specific patterns can be at the same height or have the same thickness, and can also be at different heights or have different thicknesses.

The light modulation microstructure 240 and the electrode layer 250 are located at both sides of the refractive index variable material layer 230 respectively, or both the light modulation microstructure 240 and the electrode layer 250 are located at a same side of the refractive index variable material layer 230. In the display device provided by the embodiment as shown in FIG. 6, the light modulation microstructure 240 and the electrode layer 250 are located at both sides of the refractive index variable material layer 230, respectively.

The display device provided by the embodiment of the present disclosure is provided with the plurality of electrodes located in the same layer and separated from each other and a light modulation microstructure, which is helpful to reduce the required driving voltage upon the display device being in a sharing state, and further reduce the driving power consumption of the display device. In addition, the embodiment of the present disclosure can enable the display device to realize the switching of a bilateral sharing state or a full viewing angle sharing state by setting the shapes and arrangements of the plurality of electrodes separated from each other, thus realizing a full viewing angle peep-proof function and a full viewing angle sharing function.

In some examples, as shown in FIG. 6, the refractive index variable material layer 230 includes a liquid crystal layer, the refractive index of liquid crystal in the liquid crystal layer is configured to change between a first refractive index n1 and a second refractive index n2, and the refractive index n0 of the light modulation microstructure 240 is equal to one of the first refractive index n1 and the second refractive index n2.

For example, as shown in FIG. 7, the liquid crystal in the liquid crystal layer included in the refractive index variable material layer 230 has a birefringence property. In an initial state, no driving signal is applied to the liquid crystal layer (that is, the voltage applied to the electrode layer is 0V), and the liquid crystal is in a horizontal state; and the refractive index n1 of the liquid crystal is the same as the refractive index n0 of the light modulation microstructure 240. When collimated light passes through the liquid crystal layer and the light modulation microstructure 240 in the light modulation portion 200, scattering and refraction basically do not occur, and the light exited from the light modulation portion 200 is basically collimated light, so as to realize the peep-proof state of the display device.

For example, as shown in FIG. 8, the liquid crystal in the liquid crystal layer included in the refractive index variable material layer 230 has a birefringence property. In the case where a voltage is applied to the liquid crystal layer, the liquid crystals in the liquid crystal layer are respectively driven by an electric field to form refractive indexes with circular gradient changes; and when light passes through the liquid crystal layer with gradient-changed refractive indexes, it is continuously refracted and/or scattered, and the light is no longer in a basically collimated state. However, in the case where a voltage applied to the liquid crystal layer reaches a certain voltage (e.g., ±6V), the refractive index of the liquid crystal is n2. In this case, the refractive index n2 of the liquid crystal is different from the refractive index n0 of the light modulation microstructure 240. When the light that has been refracted and/or scattered in the liquid crystal layer passes through the interface between the liquid crystal and the light modulation structure 240, it will be further refracted and/or scattered, thus further expanding the viewing angle and realizing the sharing state of the display device.

Of course, the embodiment of the present disclosure is not limited to this case. In the case where a voltage is applied to the light modulation portion, the peep-proof state of the display device can also be realized; and in the case where no voltage is applied to the light modulation portion, the sharing state of the display device can also be realized. The relationship between the refractive index of the liquid crystal in the liquid crystal layer and the refractive index of the light modulation microstructure can be set as needed.

For example, the refractive index ne (one of the refractive index n1 and the refractive index n2) of the liquid crystal in the liquid crystal layer can be in the range of 1.5-1.9, such as 1.6-1.8, such as 1.72-1.78, such as 1.76-1.77; the refractive index no (the other of the refractive index n1 and the refractive index n2) of the liquid crystal in the liquid crystal layer can be in the range of 1.3-1.7, such as 1.4-1.6, such as 1.5-1.52, such as 1.76-1.77. The difference An between the refractive index ne and the refractive index no of the liquid crystal can be in the range of 0.2~0.6, such as 0.3~0.5, such as 0.22~0.25. The clear point (Cp) of the liquid crystal in the liquid crystal layer can be in the range of 90-100, such as 91-99, such as 92-98, such as 93-97, such as 94-96, such as 93.1-93.5; the dielectric coefficient $\varepsilon//$ of the liquid crystal in the liquid crystal layer can be in the range of 10-15, such as 11-14, such as 12-13, such as 12.2-12.8; the dielectric coefficient $\varepsilon\perp$ of the liquid crystal in the liquid crystal layer can be in the range of 1~5, such as 2~4, such as 3.5~3.8; the difference $\Delta\varepsilon$ between the dielectric coefficient $\varepsilon//$ and the dielectric coefficient $\varepsilon\perp$ of the liquid crystal in the liquid crystal layer can be in the range of 6~13, such as 7~12, such as 8~11, such as 8.5~9; the oblique elastic constant K11 of the liquid crystal in the liquid crystal layer can be in the range of 10-15, such as 11-14, such as 13-13.5; the bending elastic constant K33 of the liquid crystal in the liquid crystal layer can be in the range of 12-20, such as 15-19, such as 17-18.

For example, the refractive index of the light modulation microstructure 240 can be in the range of 1.5-1.9. For example, the refractive index of the light modulation microstructure 240 can be in the range of 1.6-1.8. For example, the refractive index of the light modulation microstructure 240 can be in the range of 1.45-1.7.

In some examples, as shown in FIG. 6, one of the light modulation microstructure 240 and the electrode layer 250 is located at the light exiting side of the refractive index variable material layer 230, and the other of the light modulation microstructure 240 and the electrode layer 250 is located at the light incident side of the refractive index variable material layer 230. For example, the light modulation microstructure 240 is located on the second substrate 220, and the electrode layer 250 is located on the first substrate 210. For example, the first substrate 210 is further provided with a driving circuit, signal lines and other structures. For example, the driving circuit includes at least a thin film transistor, and the driving circuit is configured to be electrically connected with the electrode layer 250. For example, the electrode layer can be connected with a driving circuit board or a driving chip through a signal line or the like, which is not limited here.

FIG. 6 illustratively shows that the light modulation microstructure 240 is located at the light exiting side of the refractive index variable material layer 230, and the electrode layer 250 is located at the light incident side of the refractive index variable material layer 230, but not limited thereto, and the positions of the light modulation microstructure 240 and the electrode layer 250 can be interchanged.

In some examples, as shown in FIG. 6, the display panel 100 is located at the light exiting side of the light modulation portion 200, and the display panel 100 includes a liquid crystal display panel. Of course, the embodiment of the present disclosure is not limited to this case, and the display panel 100 can also be located at the light incident side of the light modulation portion 200.

For example, a backlight is provided at the light incident side of the light modulation portion 200. For example, the backlight can be the backlight shown in FIG. 1, and includes a light source and an uniform light structure. For example, the backlight can include a non-collimated common backlight and a two-layered beam splitting prism, or a collimated backlight and a one-layered inverse prism, so that the light incident on the light modulation portion is collimated light with a high degree of collimation. For example, the display panel 100 can be located at one side of the light modulation portion 200 away from the backlight, or between the light modulation portion 200 and the backlight.

For example, in the case where the collimated light is incident on the light modulation portion 200 shown in FIG. 7, the liquid crystal layer and the light modulation microstructure 240 do not change the propagation direction of the light, and the light exiting from the light modulation portion 200 is still basically collimated light; and in the case where the collimated light is incident on the light modulation portion 200 shown in FIG. 8, the cooperation between the light modulation microstructure 240 and the liquid crystal layer can further disperse the light, so as to improve the display effect when the display device is in the sharing state at a lower driving voltage.

Figure 9:
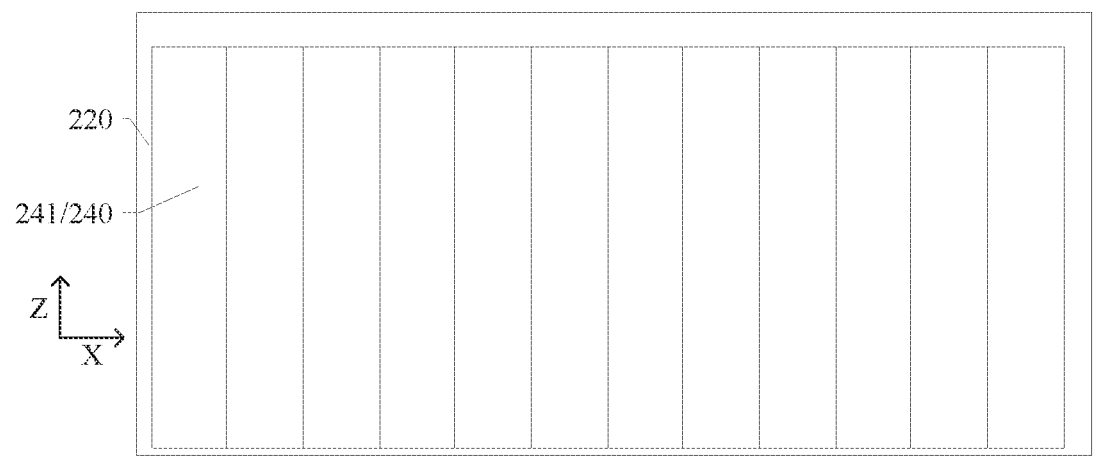
FIG. 9 is a partial planar structural view of a light modulation microstructure disposed on a second substrate in the light modulation portion shown in FIG. 6.
Figure 10:
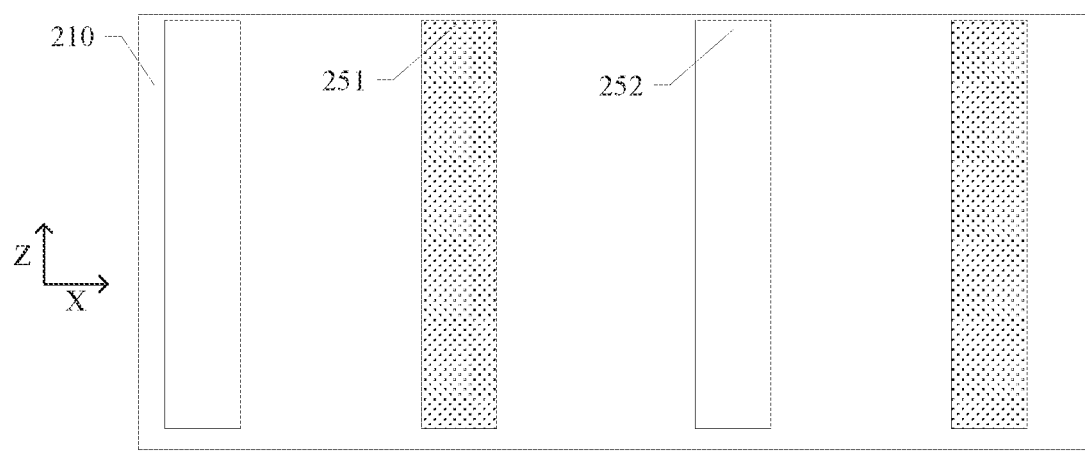
FIG. 10 is a partial planar structural view of an electrode layer disposed on a first substrate in the light modulation portion shown in FIG. 6.

FIG. 9 is a partial planar structural view of a light modulation microstructure disposed on a second substrate in the light modulation portion shown in FIG. 6, and FIG. 10 is a partial planar structural view of an electrode layer disposed on a first substrate in the light modulation portion shown in FIG. 6. In some examples, as shown in FIGS. 6, 9 and 10, the light modulation microstructure 240 includes a plurality of light modulation columns 241 extending along a first direction and arranged along a second direction, where the first direction can be the Z direction in the figure and the second direction can be the X direction in the figure. For example, the first direction is intersected with the second direction. For example, the first direction and the second direction can be perpendicular to each other. For example, the first direction and the second direction can be interchanged.

For example, the light modulation microstructure can be manufactured by ultraviolet (UV) imprint method, or the microstructure can be formed by etching process using a mask, which is not limited here.

In some examples, as shown in FIGS. 6, 9 and 10, the plurality of electrodes 2500 includes a plurality of first electrodes 251 located in a same layer. The electrode layer 250 further includes a plurality of second electrodes 252, the plurality of first electrodes 251 and the plurality of second electrodes 252 are alternately arranged along the second direction, and the first electrodes 251 and the second electrodes 252 are configured to input different voltages to drive the liquid crystal in the liquid crystal layer to deflect. For example, the first electrodes 251 and the second electrodes 252 are located in the same layer.

For example, in the case where the electrode layer 250 is only located at one side of the refractive index variable material layer 230, the electrode layer 250 can include two individual electrode layers, and different voltages are input to the two individual electrode layers. For example, one individual electrode layer includes a plurality of first electrodes 251, the other individual electrode layer includes a plurality of second electrodes 252, and the orthographic projections of the first electrodes 251 on the first substrate 210 and the orthographic projections of the second electrodes 252 on the first substrate 210 are alternately arranged, that is, the first electrodes 251 and the second electrodes 252 can be located in different layers, and an insulating layer is provided between the layer where the first electrodes 251 are located and the layer where the second electrodes 252 are located. Alternatively, one individual electrode layer includes a plurality of first electrodes 251, the other individual electrode layer can be a whole-layered electrode, and an insulating layer is provided between the two individual electrode layers.

For example, as shown in FIGS. 6, 9 and 10, the first electrode 251 and the second electrode 252 can both be straight-line-shaped, and can be, for example, strip-shaped electrodes. And the extending directions of the first electrode 251 and the second electrode 252 are both the first direction.

Figure 11:
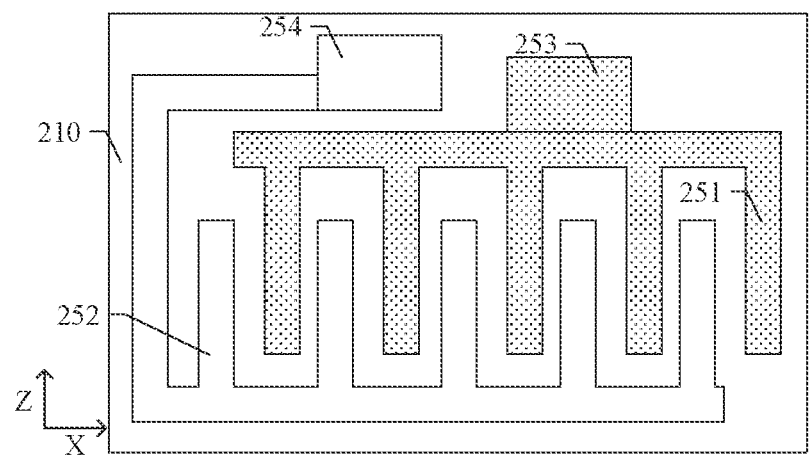
FIG. 11 is a schematic diagram of an electrode layer disposed on a first substrate in another example.

FIG. 11 is a schematic diagram of an electrode layer disposed on a first substrate in another example. For example, as shown in FIG. 11, both the first electrode 251 and the second electrode 252 are interdigitated electrodes, the plurality of first electrodes 251 are electrically connected with a first bonding region 253, the plurality of second electrodes 252 are electrically connected with a second bonding region 254, and the first bonding region 253 and the second bonding region 254 are electrically connected with a driving chip or a driving circuit. For example, the first electrode 251 includes a plurality of first sub-portions extending along the first direction and arranged along the second direction, and a first connection portion connecting the plurality of first sub-portions. The second electrode 252 includes a plurality of second sub-portions extending along the first direction and arranged along the second direction, and a second connection portion connecting the plurality of second sub-portions. The first sub-portions and the second sub-portions are alternately arranged along the second direction, that is, the first electrode and the second electrode are alternately arranged along the second direction.

For example, as shown in FIGS. 6, and 9-11, the first electrodes 251 and the second electrodes 252 can be arranged at equal intervals. For example, the line widths of the first electrode 251 and the second electrode 252 can be the same or different.

For example, the line widths of the first electrode 251 and the second electrode 252 can be in the range of 2-6 microns. For example, the line widths of the first electrode 251 and the second electrode 252 can be in the range of 3-5 microns. The line widths of the first electrode 251 and the second electrode 252 can be 4 microns.

For example, the distance between the first electrode 251 and the second electrode 252 can be in the range of 5-10 microns. For example, the distance between the first electrode 251 and the second electrode 252 can be in the range of 6-9 microns. For example, the distance between the first electrode 251 and the second electrode 252 can be in the range of 7-8 microns.

In some examples, as shown in FIGS. 6-8, the plurality of light modulation columns 241 are densely arranged. For example, the orthographic projections of adjacent light modulation columns 241 on the first substrate 210 are contacted. In the embodiment of the present disclosure, by setting that the plurality of light modulation columns are densely arranged, not only the manufacturing cost of the light modulation columns can be reduced, but also the light modulation portion can achieve a better light dispersion effect to improve the display effect of the sharing state of the display device.

For example, as shown in FIGS. 6-8, there are 2 to 5 light modulation columns 241, such as 3 to 4 light modulation columns, disposed between the first electrode 251 and the second electrode 252. In the embodiment of the present disclosure, by matching the interval between the first electrode and the second electrode with the number of light modulation columns, it is helpful to improve the display effect of the sharing state of the display device.

In some examples, as shown in FIGS. 6-8, the cross section of at least one light modulation column 241, which is taken by a plane parallel to the second direction and perpendicular to the first substrate 210, includes a triangular shape, and along a direction pointing from the center of the light modulation microstructure 240 to the center of the refractive index variable material layer 230 (i.e., a direction opposite to the direction indicated by the arrow in the Y direction), the size of the cross section in the direction parallel to the first substrate 210 gradually decreases. For example, a sharp corner of the triangular cross section faces the refractive index variable material layer 230.

For example, as shown in FIGS. 6-8, one of the first electrode 251 and the second electrode 252 is opposite to the sharp corner of the triangular cross section of the light modulation column 241, and the other of the first electrode 251 and the second electrode 252 is opposite to a concave portion formed by the adjacent side of the adjacent light modulation column 241, which is helpful to improve the display effect of the sharing state of the display device.

For example, as shown in FIGS. 6-8, in the Y direction, the thickness of the light modulation column 241 is in the range of 1-2 microns, such as 1.1-1.9 microns, such as 1.2-1.8 microns, such as 1.3-1.7 microns, such as 1.4-1.6 microns, such as 1.5 microns. For example, in the X direction, the maximum size of the light modulation column 241 can be in the range of 2.5-3.5 microns, such as 2.6-3.4 microns, such as 2.7-3.3 microns, such as 2.8-3.2 microns, such as 2.9-3.1 microns, such as 3 microns. For example, the angle of the corner of the light modulation column 241 facing the refractive index variable material layer 230 can be in the range of 65-90 degrees, such as 68-85 degrees, such as 70-80 degrees.

For example, an alignment film is provided at one side of the light modulation columns 241 facing the refractive index variable material layer 230. For example, the alignment film can be disposed on the surface of the light modulation columns 241 facing the refractive index variable material layer 230.

For example, the smaller the angle of the corner of the light modulation column 241 facing the refractive index variable material layer 230, the better the display effect of the sharing state of the display device. However, in order to prevent the angle of the corner of the light modulation column from affecting the arrangement of the alignment film, the angle of the corner of the light modulation column cannot be set too small.

Figure 12:
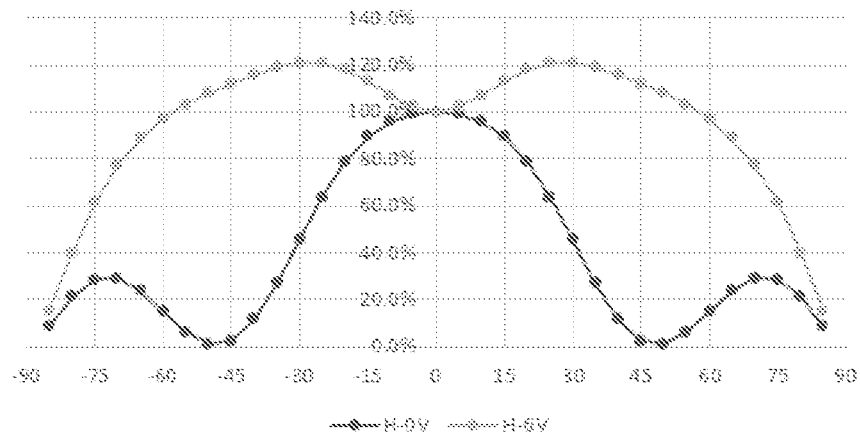
FIG. 12 shows changes of light transmittance with different viewing angles upon the light modulation portion shown in FIGS. 9 and 10 being in a sharing state or a peep-proof state in a second direction.
Figure 13:
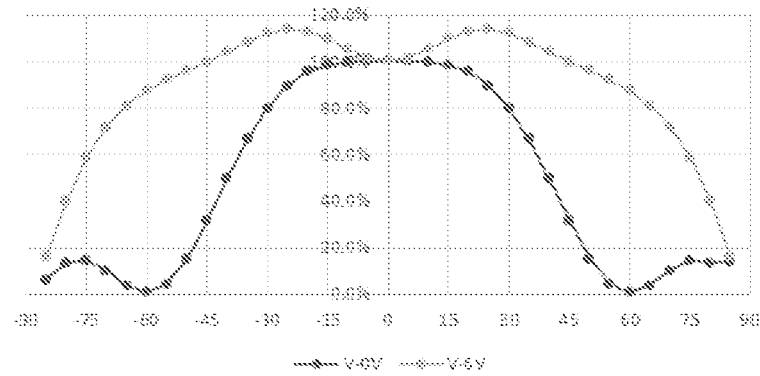
FIG. 13 shows changes of light transmittance with different viewing angles upon the light modulation portion shown in FIGS. 9 and 10 being in a sharing state or a peep-proof state in a first direction.

FIG. 12 shows changes of light transmittance with different viewing angles upon the light modulation portion shown in FIGS. 9 and 10 being in a sharing state or a peep-proof state in a second direction, and FIG. 13 shows changes of light transmittance with different viewing angles upon the light modulation portion shown in FIGS. 9 and 10 being in a sharing state or a peep-proof state in a first direction. For example, as shown in FIGS. 12 and 13, 0 degree represents the normal direction which is perpendicular to the display surface of the display panel, and 0 degree to 90 degrees represents the included angle between the viewer's line of sight and the normal, such as the viewing angle.

For example, as shown in FIG. 12, in the case where no voltage is applied to the electrode layer, in the second direction (a direction perpendicular to the extending direction of the strip-shaped electrode, e.g., the horizontal direction), as the viewing angle of the viewer changes from 0 degree to 45 degrees, the light transmittance of the light modulation portion gradually decreases to basically 0, so as to achieve a better peep-proof effect.

For example, as shown in FIG. 12, in the case where a voltage of 6V is applied to the electrode layer (the voltage difference between the first electrode and the second electrode is 6V), in the second direction, as the viewing angle of the viewer changes from 0 degree to 45 degrees, the light transmittance of the light modulation portion is at a high level, so as to achieve a better sharing effect. The light modulation portion shown in FIG. 12 can achieve a sharing state of 10%~15%@45 degrees, that is, the ratio between the display brightness at 45 degrees and the brightness at the front viewing angle or at the viewing angle perpendicular to the display panel can reach 10%-15%, thus achieving a better sharing state.

For example, as shown in FIG. 12, at the viewing angle of 45 degrees, the light transmittance of the light modulation portion in the sharing state is 40-50 times, such as 41-49 times, such as 42-48 times, such as 43-47 times, such as 44-46 times, such as 45 times, the light transmittance of the light modulation portion in the peep-proof state.

In the embodiment of the present disclosure, by setting the light modulation microstructure in the light modulation portion, the viewing angle effect that can only be achieved by adopting a higher driving voltage (e.g., 20V) required by a light modulation portion without the light modulation microstructure can be achieved by adopting a lower driving voltage (e.g., 6V), which is helpful to reduce power consumption, reduce the selection difficulty and component area of the printed circuit board assembly (PCBA) used in the driving circuit, and provides a basis for the continuous improvement of the subsequent sharing state parameters.

For example, as shown in FIG. 13, in the case where no voltage is applied to the electrode layer, in the first direction (the extending direction of the strip-shaped electrode, e.g., the vertical direction), as the viewing angle of the viewer changes from 0 degree to 45 degrees, the light transmittance of the light modulation portion gradually decreases, so as to achieve a better peep-proof effect.

For example, as shown in FIG. 13, in the case where a voltage of 6V is applied to the electrode layer (the voltage difference between the first electrode and the second electrode is 6V), in the first direction, as the viewing angle of the viewer changes from 0 degree to 45 degrees, the light transmittance of the light modulation portion is at a high level, so as to achieve a better sharing effect.

For example, as shown in FIG. 13, at the viewing angle of 45 degrees, the light transmittance of the light modulation portion in the sharing state is 2.7-4 times, such as 2.8-3.6 times, such as 3 times, the light transmittance of the light modulation portion in the peep-proof state. In the embodiment of the present disclosure, by setting the light modulation microstructure in the light modulation portion, a better viewing angle effect of the sharing state can be achieved by adopting a lower driving voltage, which is helpful to reduce power consumption.

Figure 14:
FIG. 14 shows a display surface of the display panel shown in FIG. 6.

FIG. 14 shows the display surface of the display panel shown in FIG. 6. In some examples, as shown in FIG. 14, the display panel 100 includes a display surface 101, the shape of the display surface 101 includes a rectangular shape, and the rectangular shape includes two sides extending along the first direction (i.e., Z direction) and two sides extending along the second direction (i.e., X direction).

For example, as shown in FIG. 14, the sides of the display surface 101 extending along the first direction can be short sides, and the sides of the display surface 101 extending along the second direction can be long sides. Taking that the long side is a horizontal side and the short side is a vertical side as an example, FIG. 12 illustrates the effects of the peep-proof state and the sharing state in the horizontal direction shown in FIG. 14, and FIG. 13 illustrates the effects of the peep-proof state and the sharing state in the vertical direction shown in FIG. 14. Of course, the embodiment of the present disclosure is not limited to this case, and the extending directions of the long side and the short side can be interchanged.

For example, the display panel in the embodiment of the present disclosure can have the same features as the display panel shown in FIG. 1, and details will not be repeated here.

Figure 15A:
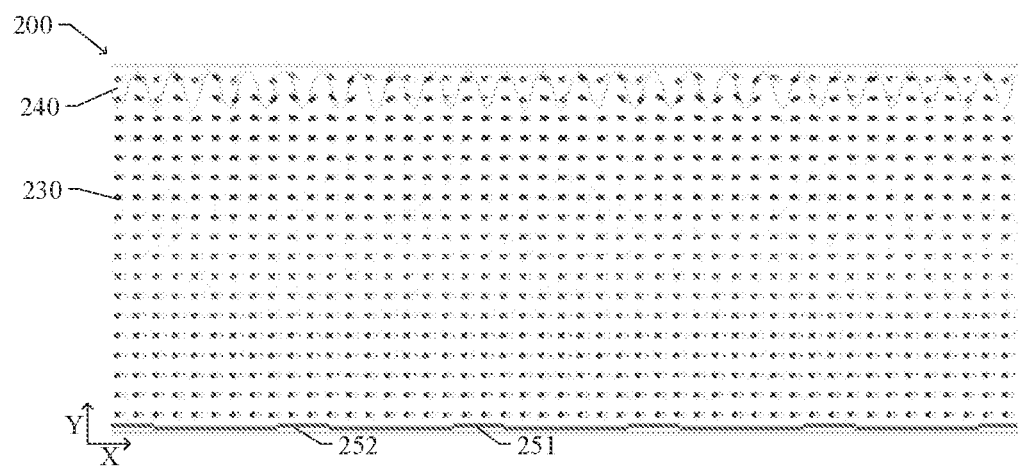
FIGS. 15A and 15B are simulation diagrams of a light modulation portion in a display device provided by another example of the embodiment of the present disclosure under the condition of whether power is on or off.
Figure 15B:
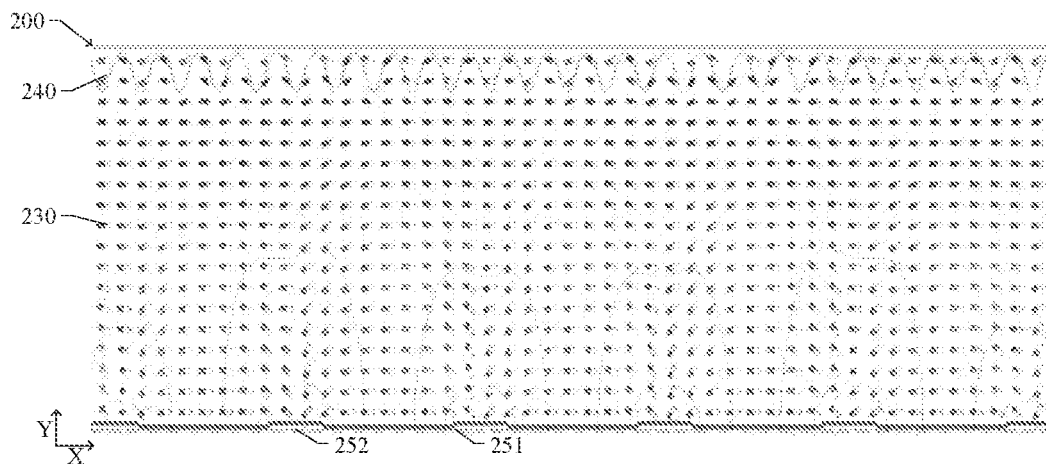
Figure 16A:
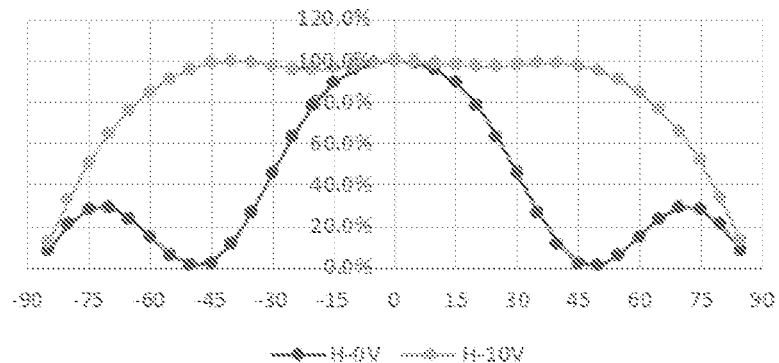
FIG. 16A shows changes of light transmittance with different viewing angles upon the light modulation portion shown in FIGS. 15A and 15B being in a sharing state or a peep-proof state in a second direction.
Figure 16B:
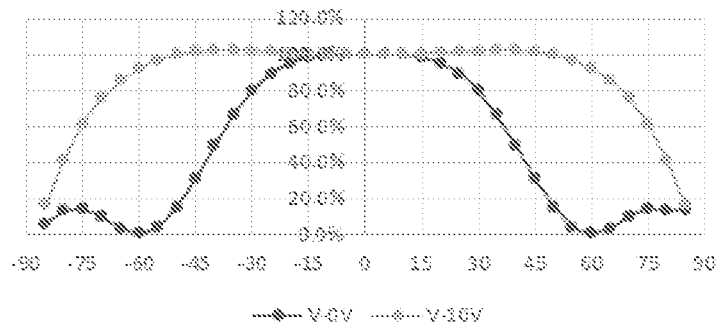
FIG. 16B shows changes of transmittance with different viewing angles upon the light modulation portion shown in FIGS. 15A and 15B being in a sharing state or a peep-proof state in a first direction.

FIGS. 15A and 15B are simulation diagrams of a light modulation portion in a display device provided by another example of the embodiment of the present disclosure under the condition of whether power is on or off, FIG. 16A shows changes of light transmittance with different viewing angles upon the light modulation portion shown in FIGS. 15A and 15B being in a sharing state or a peep-proof state in a second direction, and FIG. 16B shows changes of transmittance with different viewing angles upon the light modulation portion shown in FIGS. 15A and 15B being in a sharing state or a peep-proof state in a first direction.

The light modulation portion 200 shown in FIGS. 15A-16B is different from the light modulation portion 200 in the example shown in FIGS. 6-14 in that the shapes of the light modulation columns 241 included in the light modulation microstructure 240 are different, and for example, the cross-sectional shapes of the light modulation columns 241 are different. For example, as shown in FIGS. 15A and 15B, the cross section of at least one light modulation column 241, which is taken by a plane parallel to the second direction and perpendicular to the first substrate 210 (a plane parallel to the XY plane), includes an arc shape, and along the direction pointing from the center of the light modulation microstructure 240 to the center of the refractive index variable material layer 230, the size of the cross section in the direction (X direction) parallel to the first substrate gradually decreases.

For example, the side, facing the refractive index variable material layer 230, of the cross section of the light modulation column 241 can be an arc side. For example, the cross-sectional shape of the light modulation column 241 can be a semicircular shape. For example, the radius of the semicircular shape can be in the range of 1-2 microns, such as 1.2-1.8 microns, such as 1.3-1.7 microns, such as 1.4-1.6 microns, such as 1.5 microns.

For example, the electrode layer and the refractive index variable material layer in the present example can have the same features as the electrode layer and the refractive index variable material layer shown in FIGS. 6-14, and details will not be repeated here.

For example, as shown in FIG. 15A, the liquid crystal in the liquid crystal layer included in the refractive index variable material layer 230 has a birefringence property. In an initial state, no driving signal is applied to the liquid crystal layer (that is, 0V), and the liquid crystal is in a horizontal state; and the refractive index n1 of the liquid crystal is the same as the refractive index n0 of the light modulation microstructure 240. When collimated light passes through the liquid crystal layer and the light modulation microstructure 240 in the light modulation portion 200, scattering and refraction basically do not occur, and the light exited from the light modulation portion 200 is basically collimated light, so as to realize the peep-proof state of the display device.

For example, as shown in FIG. 15B, the liquid crystal in the liquid crystal layer included in the refractive index variable material layer 230 has a birefringence property. In the case where a voltage is applied to the liquid crystal layer, the liquid crystals in the liquid crystal layer are respectively driven by an electric field to form refractive indexes with circular gradient changes; and when light passes through the liquid crystal layer with gradient-changed refractive indexes, it is continuously refracted and/or scattered, and the light is no longer in a basically collimated state. However, in the case where a voltage applied to the liquid crystal layer reaches a certain voltage (e.g., ±10V), the refractive index of the liquid crystal is n2. In this case, the refractive index n2 of the liquid crystal is different from the refractive index n0 of the light modulation microstructure 240. When the light that has been refracted and/or scattered in the liquid crystal layer passes through the interface between the liquid crystal and the light modulation structure 240, it will be further refracted and/or scattered, thus further expanding the viewing angle and realizing the sharing state of the display device.

For example, as shown in FIGS. 15A and 15B, there are 2 to 5 light modulation columns 241, such as 3 to 4 light modulation columns 241, disposed between the first electrode 251 and the second electrode 252. In the embodiment of the present disclosure, by matching the interval between the first electrode and the second electrode with the number of light modulation columns, it is helpful to improve the display effect of the sharing state of the display device.

For example, as shown in FIG. 16A, in the case where no voltage is applied to the electrode layer, in the second direction (a direction perpendicular to the extending direction of the strip-shaped electrode, e.g., the horizontal direction), as the viewing angle of the viewer changes from 0 degree to 45 degrees, the light transmittance of the light modulation portion gradually decreases to basically 0, so as to achieve a better peep-proof effect. For example, in the case where a voltage of 10V is applied to the electrode layer, in the second direction, as the viewing angle of the viewer changes from 0 degree to 45 degrees, the light transmittance of the light modulation portion is at a high level, so as to achieve a better sharing effect.

For example, as shown in FIG. 16A, at the viewing angle of 45 degrees, the light transmittance of the light modulation portion in the sharing state is 20-50 times, such as 25-45 times, such as 30-40 times, such as 32-37 times, such as 35 times, the light transmittance of the light modulation portion in the peep-proof state. In the embodiment of the present disclosure, by setting the light modulation microstructure in the light modulation portion, the viewing angle effect that can only be achieved by adopting a higher driving voltage (e.g., 20V) required by a light modulation portion without the light modulation microstructure can be achieved by adopting a lower driving voltage (e.g., 10V), which is helpful to reduce power consumption, reduce the selection difficulty and component area of the printed circuit board assembly (PCBA) used in the driving circuit, and provides a basis for the continuous improvement of the subsequent sharing state parameters.

For example, as shown in FIG. 16B, in the case where no voltage is applied to the electrode layer, in the first direction (the extending direction of the strip-shaped electrode, e.g., the vertical direction), as the viewing angle of the viewer changes from 0 degree to 45 degrees, the light transmittance of the light modulation portion gradually decreases, so as to achieve a better peep-proof effect. For example, in the case where a voltage of 10V is applied to the electrode layer, in the first direction, as the viewing angle of the viewer changes from 0 degree to 45 degrees, the light transmittance of the light modulation portion is at a high level, so as to achieve a better sharing effect.

For example, as shown in FIG. 16B, at the viewing angle of 45 degrees, the light transmittance of the light modulation portion in the sharing state is 2.5-3.5 times, such as 2.8-3.2 times, such as 3 times, the light transmittance of the light modulation portion in the peep-proof state. In the embodiment of the present disclosure, by setting the light modulation microstructure in the light modulation portion, a better viewing angle effect of the sharing state can be achieved by adopting a lower driving voltage, which is helpful to reduce power consumption.

Figure 17A:
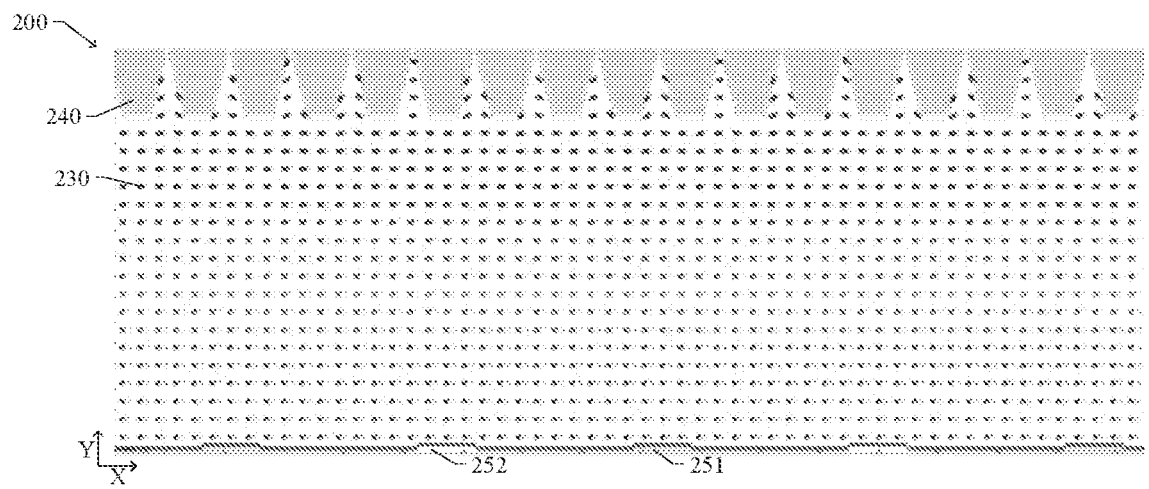
FIGS. 17A and 17B are simulation diagrams of a light modulation portion in a display device provided by another example of the embodiment of the present disclosure under the condition of whether power is on or off.
Figure 17B:
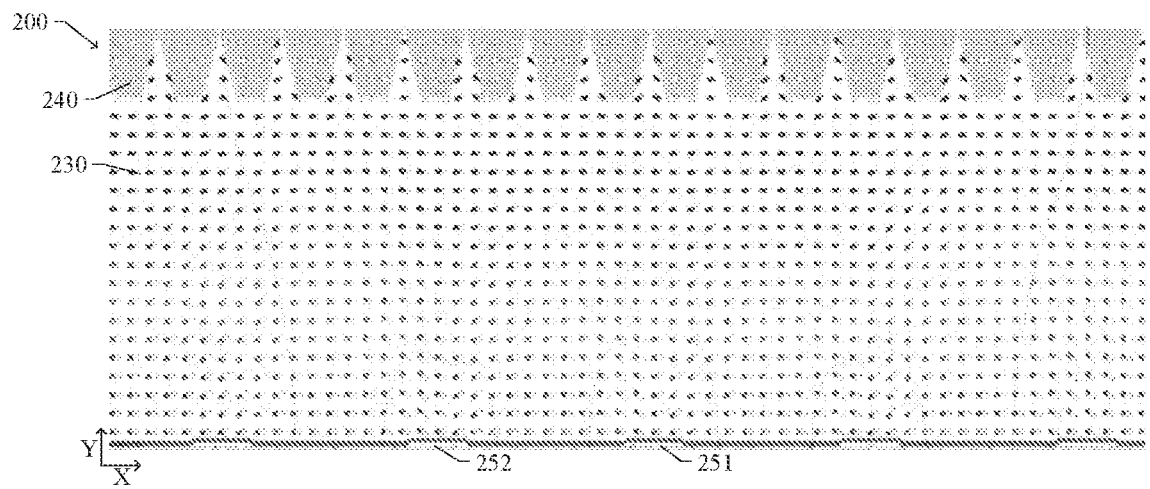
Figure 18A:
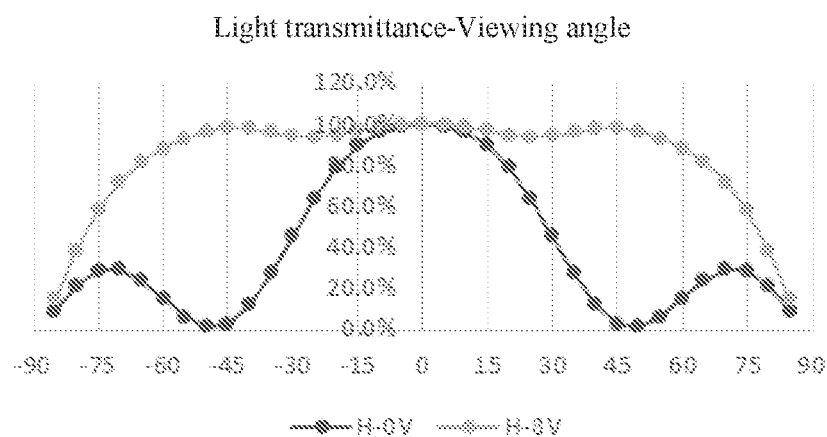
FIG. 18A shows changes of light transmittance with different viewing angles upon the light modulation portion shown in FIGS. 17A and 17B being in a sharing state or a peep-proof state in a second direction.
Figure 18B:
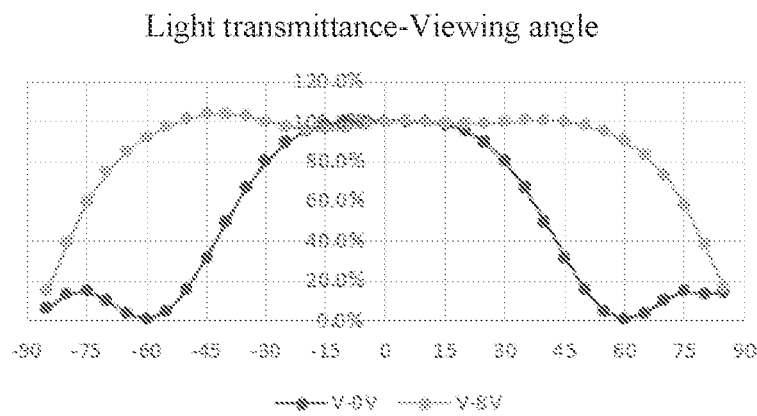
FIG. 18B shows changes of light transmittance with different viewing angles upon the light modulation portion shown in FIGS. 17A and 17B being in a sharing state or a peep-proof state in a first direction.

FIGS. 17A and 17B are simulation diagrams of a light modulation portion in a display device provided by another example of the embodiment of the present disclosure under the condition of whether power is on or off. FIG. 18A shows changes of light transmittance with different viewing angles upon the light modulation portion shown in FIGS. 17A and 17B being in a sharing state or a peep-proof state in a second direction, and FIG. 18B shows changes of light transmittance with different viewing angles upon the light modulation portion shown in FIGS. 17A and 17B being in a sharing state or a peep-proof state in a first direction.

The light modulation portion 200 shown in FIGS. 17A-18B is different from the light modulation portion 200 in the example shown in FIGS. 6-14 in that the light modulation microstructure 240 includes light modulation columns 241 with different shapes, such as different cross-sectional shapes. For example, as shown in FIGS. 17A-18B, in some examples, the cross section of at least one light modulation column 241, which is taken by a plane parallel to the second direction and perpendicular to the first substrate 210 (a plane parallel to the XY plane), includes a trapezoidal shape, and along the direction pointing from the center of the light modulation microstructure 240 to the center of the refractive index variable material layer 230, the size of the cross section in the direction parallel to the first substrate gradually decreases.

For example, in the cross-sectional shape of the light modulation column 241, the side facing the refractive index variable material layer 230 is an upper side, the side away from the refractive index variable material layer 230 is a lower side, and the length of the lower side is longer than the length of the upper side. For example, the ratio of the length of the lower side to the length of the upper side can be in the range of 2-2.5, such as 2.1-2.4. For example, the length of the lower side can be 3 microns, and the length of the upper side can be 1.27 microns. For example, the angle between the lower side and the lateral side can be 50-70 degrees, such as 55-65 degrees, such as 60 degrees.

For example, the electrode layer and the refractive index variable material layer in the present example can have the same features as the electrode layer and the refractive index variable material layer shown in FIGS. 6-14, and details will not be repeated here.

For example, as shown in FIG. 17A, the liquid crystal in the liquid crystal layer included in the refractive index variable material layer 230 has a birefringence property. In an initial state, no driving signal is applied to the liquid crystal layer (that is, 0V), and the liquid crystal is in a horizontal state; and the refractive index n1 of the liquid crystal is the same as the refractive index n0 of the light modulation microstructure 240. When collimated light passes through the liquid crystal layer and the light modulation microstructure 240 in the light modulation portion 200, scattering and refraction basically do not occur, and the light exited from the light modulation portion 200 is basically collimated light, so as to realize the peep-proof state of the display device.

For example, as shown in FIG. 17B, the liquid crystal in the liquid crystal layer included in the refractive index variable material layer 230 has a birefringence property. In the case where a voltage is applied to the liquid crystal layer, the liquid crystals in the liquid crystal layer are respectively driven by an electric field to form refractive indexes with circular gradient changes; and when light passes through the liquid crystal layer with gradient-changed refractive indexes, it is continuously refracted and/or scattered, and the light is no longer in a basically collimated state. However, in the case where a voltage applied to the liquid crystal layer reaches a certain voltage (e.g., ±8V), the refractive index of the liquid crystal is n2. In this case, the refractive index n2 of the liquid crystal is different from the refractive index n0 of the light modulation microstructure 240. When the light that has been refracted and/or scattered in the liquid crystal layer passes through the interface between the liquid crystal and the light modulation structure 240, it will be further refracted and/or scattered, thus further expanding the viewing angle and realizing the sharing state of the display device.

For example, as shown in FIGS. 17A and 17B, there are 2 to 5 light modulation columns 241, such as 3 to 4 light modulation columns, disposed between the first electrode 251 and the second electrode 252. In the embodiment of the present disclosure, by matching the interval between the first electrode and the second electrode with the number of light modulation columns, it is helpful to improve the display effect of the sharing state of the display device.

For example, as shown in FIG. 18A, in the case where no voltage is applied to the electrode layer, in the second direction (a direction perpendicular to the extending direction of the strip-shaped electrode, e.g., the horizontal direction), as the viewing angle of the viewer changes from 0 degree to 45 degrees, the light transmittance of the light modulation portion gradually decreases to basically 0, so as to achieve a better peep-proof effect. For example, in the case where a voltage of 8V is applied to the electrode layer, in the second direction, as the viewing angle of the viewer changes from 0 degree to 45 degrees, the light transmittance of the light modulation portion is at a high level, so as to achieve a better sharing effect.

For example, as shown in FIG. 18A, at the viewing angle of 45 degrees, the light transmittance of the light modulation portion in the sharing state is 30-40 times, such as 32-38 times, such as 35 times, that of the light modulation portion in the peep-proof state. In the embodiment of the present disclosure, by setting the light modulation microstructure in the light modulation portion, the viewing angle effect that can only be achieved by adopting a higher driving voltage (e.g., 20V) required by a light modulation portion without the light modulation microstructure can be achieved by adopting a lower driving voltage (e.g., 8V), which is helpful to reduce power consumption, reduce the selection difficulty and component area of the printed circuit board assembly (PCBA) used in the driving circuit, and provides a basis for the continuous improvement of the subsequent sharing state parameters.

For example, as shown in FIG. 18B, in the case where no voltage is applied to the electrode layer, in the first direction (the extending direction of the strip-shaped electrode, e.g., the vertical direction), as the viewing angle of the viewer changes from 0 degree to 45 degrees, the light transmittance of the light modulation portion gradually decreases, so as to achieve a better peep-proof effect. For example, in the case where a voltage of 8V is applied to the electrode layer, in the first direction, as the viewing angle of the viewer changes from 0 degree to 45 degrees, the light transmittance of the light modulation portion is at a high level, so as to achieve a better sharing effect.

For example, as shown in FIGS. 18A and 18B, at the viewing angle of 45 degrees, the light transmittance of the light modulation portion in the sharing state is 2.5-3.5 times, such as 3 times, the light transmittance of the light modulation portion in the peep-proof state. In the embodiment of the present disclosure, by setting the light modulation microstructure in the light modulation portion, a better viewing angle effect of the sharing state can be achieved by adopting a lower driving voltage, which is helpful to reduce power consumption.

In the display device provided by the embodiment of the present disclosure, the electrode layer includes the first electrodes and the second electrodes alternately arranged along the second direction, and the light modulation microstructure includes the plurality of light modulation columns arranged along the second direction. By setting the positional and size relationship of the electrode layer, the light modulation microstructure and the liquid crystal layer, not only a better viewing angle effect in the second direction can be achieved by adopting a lower driving voltage, which is helpful to reduce the power consumption, but also the viewing angle effect of the sharing state in the first direction can be improved.

Figure 19:
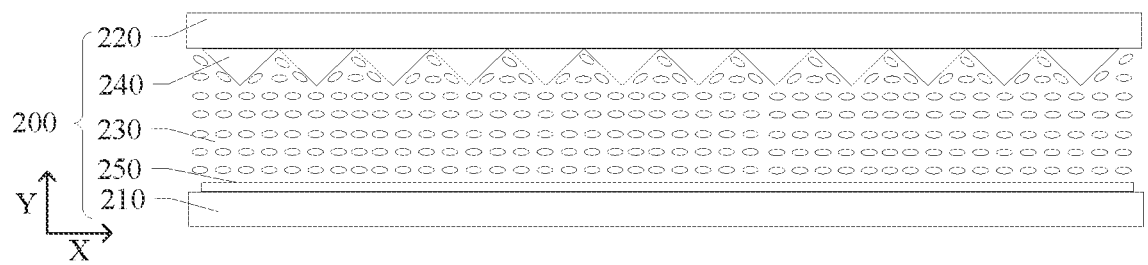
FIG. 19 is a partial structural view of a light modulation portion provided by another example of the embodiment of the present disclosure.
Figure 20:
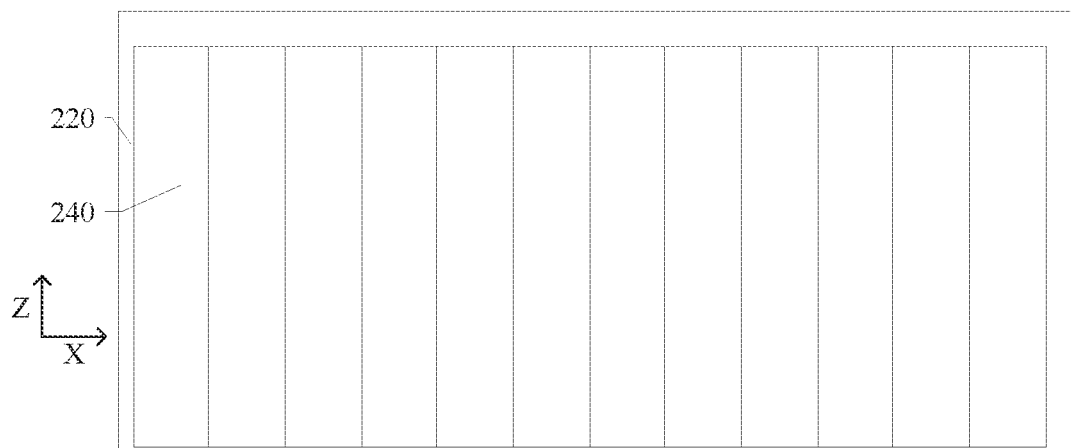
FIG. 20 is a partial planar structural view of a light modulation microstructure disposed on a second substrate.
Figure 21:
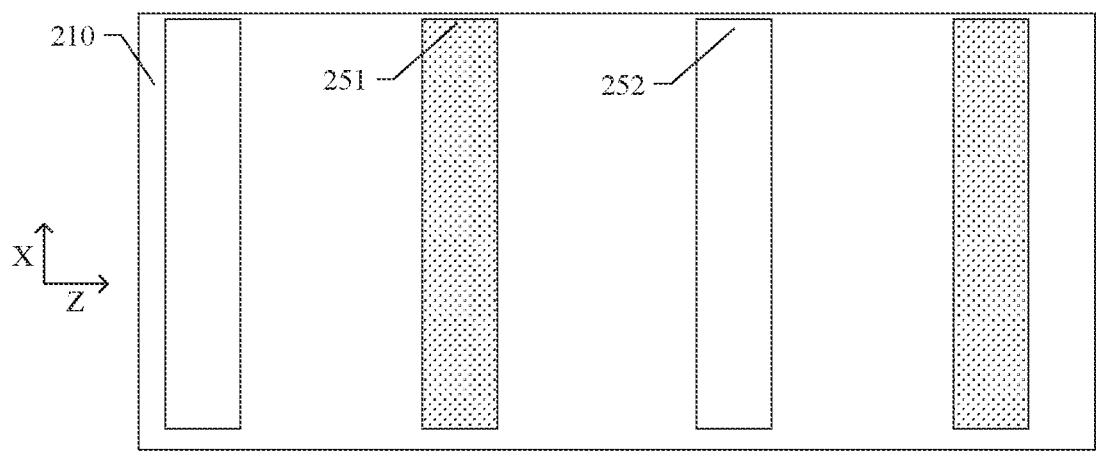
FIG. 21 is a partial planar structural view of an electrode layer disposed on a first substrate.

FIG. 19 is a partial structural view of a light modulation portion provided by another example of the embodiment of the present disclosure, FIG. 20 is a partial planar structural view of a light modulation microstructure disposed on a second substrate, and FIG. 21 is a partial planar structural view of an electrode layer disposed on a first substrate. The light modulation portion in the example shown in FIGS. 19-21 is different from the light modulation portion in the example shown in FIGS. 6-10 in that the arrangement direction of the first electrodes 251 and the second electrodes 252 is different from the arrangement direction of the plurality of light modulation columns 241 in the present example. In the present example, by setting the arrangement direction of the first electrodes and the second electrodes to be different from the arrangement direction of the plurality of light modulation columns, not only the viewing angle effect of the sharing state in the direction parallel to the arrangement direction of the first electrodes and the second electrodes can be improved, but also the viewing angle effect of the sharing state in the direction perpendicular to the arrangement direction of the first electrodes and the second electrodes can be improved, so as to improve the full viewing angle sharing state effect, such as improving a four-sided switchable display effect between the peep-proof state and the sharing state.

In some examples, as shown in FIGS. 19-21, the light modulation microstructure 240 includes a plurality of light modulation columns 241 extending along a first direction and arranged along a second direction, the plurality of electrodes include a plurality of first electrodes 251, the electrode layer 250 further includes a plurality of second electrodes 252, the plurality of first electrodes 251 and the plurality of second electrodes 252 are alternately arranged, the arrangement direction of the plurality of first electrodes 251 and the plurality of second electrodes 252 is intersected with the second direction, the first electrodes 251 and the second electrodes 252 are configured to input different voltages, and the first direction is intersected with the second direction.

For example, as shown in FIGS. 19-21, the first electrodes 251 and the second electrodes 252 are arranged along the first direction.

For example, as shown in FIGS. 19-21, the first electrode 251 and the second electrode 252 can both be straight-line-shaped electrodes, such as strip-shaped electrodes. For example, the first electrodes 251 and the second electrodes 252 can be located in the same layer or in different layers. Of course, the present example is not limited thereto. In the case where the first electrodes and the second electrodes are located in different layers, the first electrodes can be strip-shaped electrodes separated from each other, and the second electrode can be a whole-layered plate electrode.

Figure 22:
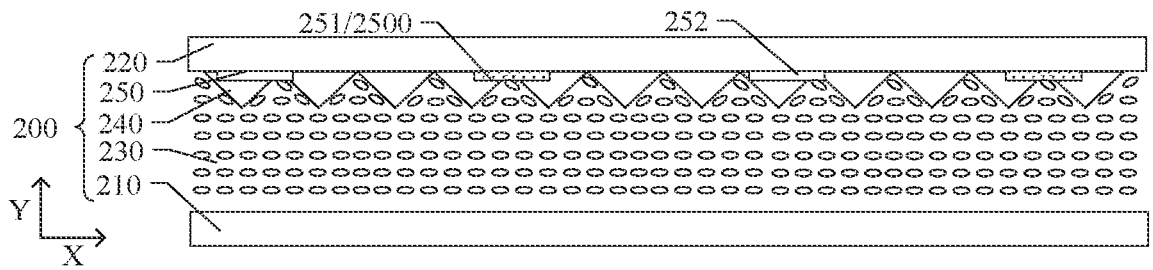
FIG. 22 is a partial structural view of a light modulation portion provided by another example of the embodiment of the present disclosure.

FIG. 22 is a partial structural view of a light modulation portion provided by another example of the embodiment of the present disclosure. The light modulation portion in the example shown in FIG. 22 is different from the light modulation portion in the example shown in FIGS. 6-10 in that both the electrode layer 250 and the light modulation microstructure 240 are located at the same side of the refractive index variable material layer 230 in the present example. For example, the electrode layer 250 and the light modulation microstructure 240 can both be located at the light incident side of the refractive index variable material layer 230, or the electrode layer 250 and the light modulation microstructure 240 can both be located at the light exiting side of the refractive index variable material layer 230.

The features in the present example, such as the shape and arrangement rule of the light modulation microstructure 250, the shapes and arrangement rules of the first electrodes 251 and the second electrodes 252 in the electrode layer 250, and the refractive index relationship between the light modulation microstructure 250 and the refractive index variable material layer 230, can be the same as the corresponding features in the light modulation portion shown in FIGS. 6-21, and details will not be repeated here.

Figure 23:
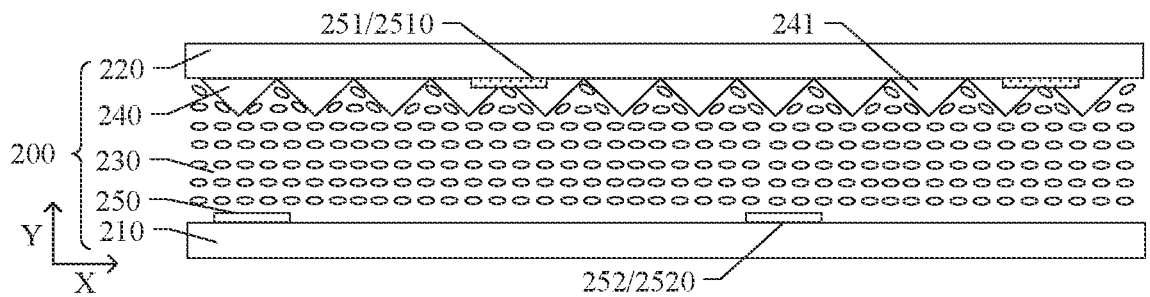
FIG. 23 is a partial structural view of a light modulation portion provided by another example of the embodiment of the present disclosure.

FIG. 23 is a partial structural view of a light modulation portion provided by another example of the embodiment of the present disclosure. The light modulation portion in the example shown in FIG. 23 is different from the light modulation portion in the example shown in FIGS. 6-10 in that the electrode layer 250 in the present example includes a first electrode layer 2510 and a second electrode layer 2520 respectively located at both sides of the refractive index variable material layer 230.

In some examples, as shown in FIG. 23, the electrode layer 250 includes a first electrode layer 2510 and a second electrode layer 2520, one of the first electrode layer 2510 and the second electrode layer 2520 is located at one side of the light modulation microstructure 240 away from the refractive index variable material layer 230, the other of the first electrode layer 2510 and the second electrode layer 2520 is located at one side of the refractive index variable material layer 230 away from the light modulation microstructure 240, at least one of the first electrode layer 2510 and the second electrode layer 2520 includes a plurality of electrodes located in the same layer and separated from each other, and the first electrode layer 2510 and the second electrode layer 2520 are configured to input different voltages.

For example, as shown in FIG. 23, the first electrode layer 2510 is located between the second substrate 220 and the refractive index variable material layer 230, and the second electrode layer 2520 is located between the first substrate 210 and the refractive index variable material layer 230, but it is not limited to this case, and the positions of the first electrode layer 2510 and the second electrode layer 2520 can be interchanged.

In some examples, as shown in FIG. 23, the plurality of electrodes includes a plurality of first electrodes 251, the first electrode layer 2510 includes the plurality of first electrodes 251 separated from each other, the second electrode layer 2520 includes a plurality of second electrodes 252 separated from each other, the arrangement direction of the plurality of first electrodes 251 is the same as the arrangement direction of the plurality of second electrodes 252, and at least part of the orthographic projection of the second electrodes 252 on the first electrode layer 2510 does not overlap with the first electrodes 251. The embodiment of the present disclosure is not limited to this case, and the first electrode layer and the second electrode layer can also be arranged such that one of them includes a plurality of electrodes located in the same layer and separated from each other, and the other is a whole-layered plate electrode.

For example, as shown in FIG. 23, the orthographic projection of the second electrode 252 on the first electrode layer 2510 is located in the interval between adjacent first electrodes 251. For example, the orthographic projections of the first electrodes 251 and the second electrodes 252 on the first substrate 210 are alternately arranged in the X direction.

In some examples, as shown in FIG. 23, the light modulation microstructure 240 includes a plurality of light modulation columns 241 extending along a first direction and arranged along a second direction, and the first direction is intersected with the second direction; the plurality of first electrodes 251 are arranged in along of the first direction and the second direction. For example, the first electrode 251 and the second electrode 252 are both strip-shaped electrodes extending along the first direction. The light modulation columns 241 included in the light modulation microstructure 240 in the present example have the same features as the light modulation columns 241 in any example shown in FIGS. 6-22, and details will not be repeated here.

For example, as shown in FIG. 23, the arrangement direction of the first electrodes 251, the arrangement direction of the second electrodes 252 and the arrangement direction of the light modulation columns 241 are all the same. However, the embodiment of the present disclosure is not limited to this case, and the arrangement direction of the first electrodes 251 is the same as the arrangement direction of the second electrodes 252, which can be intersected with the arrangement direction of the light modulation columns 241, as shown in FIGS. 19-21.

In the present example, the electrode layers are set as two electrode layers respectively located at both sides of the refractive index variable material layer, the two electrode layers include a plurality of first electrodes and a plurality of second electrodes respectively, and the arrangement direction of the first electrodes, the arrangement direction of the second electrodes and the arrangement direction of the light modulation columns are all the same, which is helpful to achieve a better display effect of sharing state and peep-proof state under the condition of using a lower driving voltage.

Figure 24:
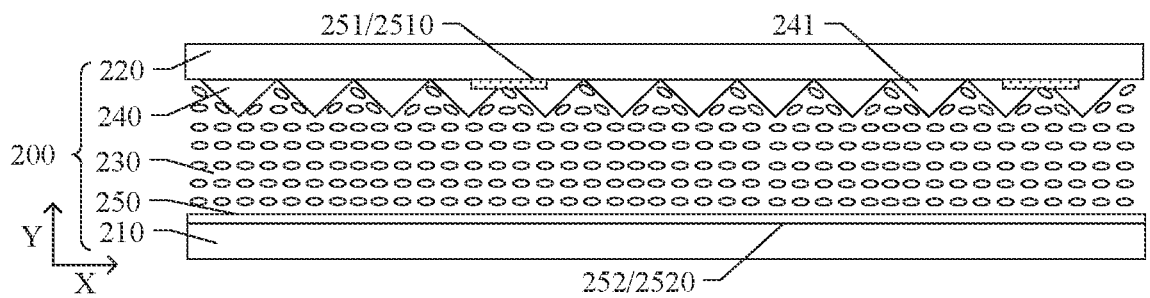
FIGS. 24-26 are partial structural views of a light modulation portion provided by another example of the embodiment of the present disclosure.
Figure 25:
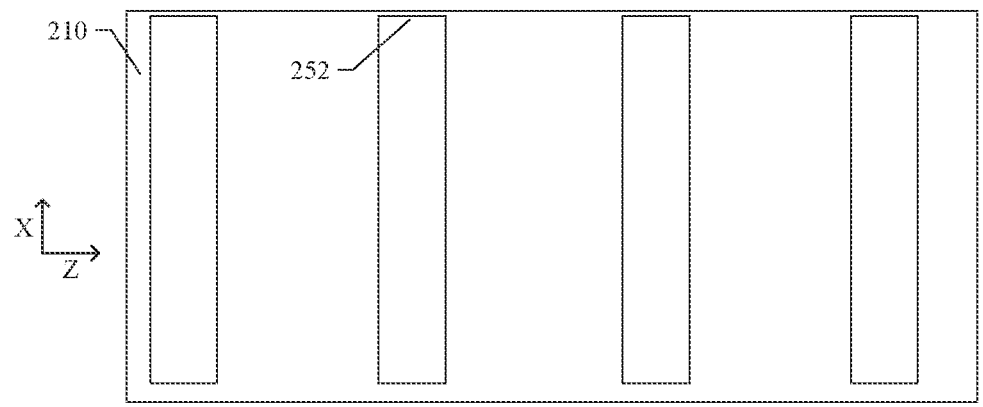
Figure 26:
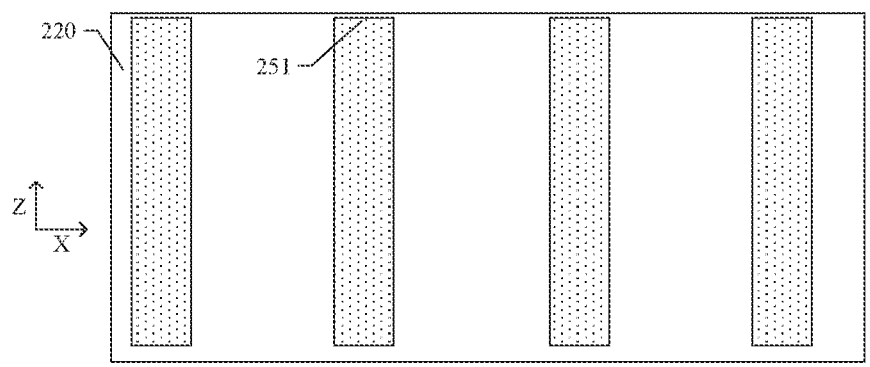

FIGS. 24-26 are partial structural views of a light modulation portion provided by another example of the embodiment of the present disclosure. The light modulation portion in the example shown in FIGS. 24-26 is different from the light modulation portion in the example shown in FIG. 23 in that the first electrode layer 2510 includes a plurality of first electrodes 251 separated from each other, the second electrode layer 2520 includes a plurality of second electrodes 252 separated from each other, and the arrangement direction of the first electrodes 251 is intersected with the arrangement direction of the second electrodes 252. In the present example, the arrangement direction of the plurality of first electrodes and the arrangement direction of the plurality of second electrodes are intersected while the light modulation microstructure is set in the light modulation portion, so that a better display effect of sharing state and peep-proof state can be achieved under the condition of adopting a lower driving voltage, and at the same time, a display effect of switching between multilateral sharing state and peep-proof state, such as a display effect of switching between full viewing angle sharing state and peep-proof state, can be achieved.

For example, in the case where the electrode distribution shown in FIGS. 24-26 is adopted, when a driving voltage, such as 4V~6V, such as 4.5V~5.5V, such as 5V, is applied to the electrode layer, as the viewing angle of the viewer changes from 0 degree to 45 degrees no matter in the Z direction or the X direction, the light transmittance of the light modulation portion is always at a high level, so as to achieve a better sharing effect. At the viewing angle of 45 degrees, the light transmittance of the light modulation portion in the sharing state is 20-30 times, such as 25 times, the light transmittance of the light modulation portion in the peep-proof state. In the embodiment of the present disclosure, the light modulation microstructure is set in the light modulation portion, and by adopting a lower driving voltage, not only a better display effect of switching between the peep-proof state and the sharing state in one direction can be achieved, but also a display effect of switching between the peep-proof state and the sharing state in the other direction can be improved, thus achieving the display effect of four-sided peep-proof state and sharing state.

For example, as shown in FIGS. 24-26, the plurality of first electrodes 251 are arranged along the X direction, and the plurality of second electrodes 252 are arranged along the Z direction. For example, the arrangement direction of the first electrodes 251 is perpendicular to the arrangement direction of the second electrodes 252. For example, the first electrodes 251 and the second electrodes 252 can both be strip-shaped electrodes, and the extending direction of the first electrode 251 is intersected with the extending direction of the second electrode 252.

For example, the line widths of the first electrode 251 and the second electrode 242 can both be in the range of 1.5-3 microns, such as 2 microns. For example, the distance between adjacent first electrodes 251 can be in the range of 8-12 microns, such as 9-11 microns, such as 10 microns. For example, the distance between adjacent second electrodes 252 can be in the range of 8-12 microns, such as 9-11 microns, such as 10 microns.

In some examples, as shown in FIGS. 24 to 26, the light modulation microstructure 240 includes a plurality of light modulation columns 241 extending along a first direction and arranged along a second direction, and the first direction is intersected with the second direction; the plurality of first electrodes 251 are arranged in along one of the first direction and the second direction, and the plurality of second electrodes 252 are arranged along the other of first direction and the second direction. The features, such as arrangement manner and shape, of the light modulation columns in the present example can be the same as those of the light modulation columns in the examples shown in FIGS. 6-23, and details will not be repeated here.

In the present example, the arrangement direction of the light modulation columns is set to be the same as one of the arrangement direction of the first electrodes and the arrangement direction of the second electrodes, which can further improve the display effect of the sharing state in this arrangement direction.

Figure 27:
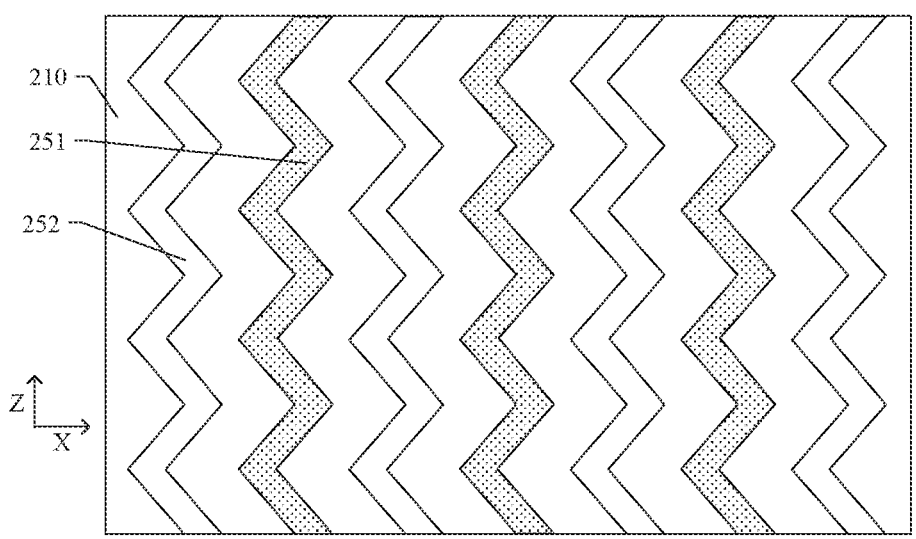
FIGS. 27 and 28 are partial planar structural views of electrode layers provided by different examples of the embodiment of the present disclosure.
Figure 28:
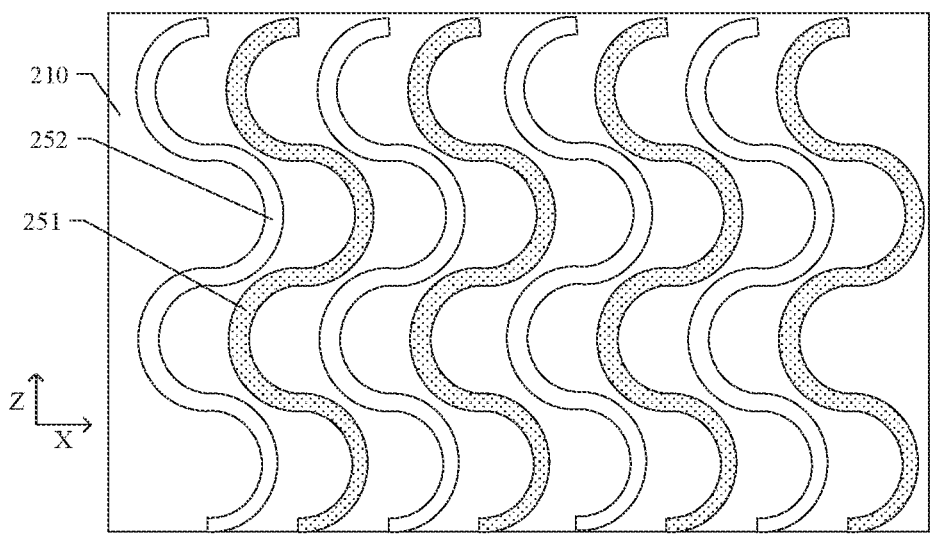

FIGS. 27 and 28 are partial planar structural views of electrode layers provided by different examples of the embodiment of the present disclosure. The electrode layer in the light modulation portion in the example shown in FIGS. 27 and 28 is different from the electrode layer in the light modulation portion shown in FIGS. 6-26 in that the shapes of the plurality of electrodes are different.

In some examples, as shown in FIGS. 27 and 28, the shapes of at least some electrodes among the plurality of first electrodes 251 and the plurality of second electrodes 252 include a folded line shape or a wavy line shape. In these examples, except that the shapes of the electrodes are different from the shapes of the electrodes in the above examples, the arrangement and positional relationship of the electrodes can be the same as the corresponding features in the above examples, and details will not be repeated here.

For example, as shown in FIG. 27, the shape of the electrode is a folded line shape, and the included angle between two connected line segments can be in the range of 60-90 degrees, such as 70-80 degrees; the line width of the electrode can be in the range of 15-25 microns, such as 18-22 microns, such as 20 microns; the distance between adjacent electrodes can be in the range of 5-10 microns, such as 6-9 microns, such as 7-8 microns. For example, two line segments connected to each other in the electrode strip can form a W-shape.

In the embodiment of the present disclosure, by changing the shapes of the electrodes, each electrode can include a plurality of sub-portions with different extending directions, and the liquid crystal can have different deflection directions in different arrangement directions corresponding to the sub-portions with different extending directions, so as to realize light divergence in different arrangement directions, and further to achieve a better display effect of sharing state. That is, by further setting the electrodes to be polygonal or curved, electric field lines in all directions for driving the liquid crystal to rotate can be realized, so as to achieve a full viewing angle peep-proof state and a full viewing angle sharing state.

For example, in the case where the shape of the electrode shown in FIG. 27 is adopted, upon a driving voltage of 5V~7V, such as 5.5V~6.5V, such as 6V, being applied to the electrode layer, in the X direction, as the viewing angle of the viewer changes from 0 degree to 45 degrees, the light transmittance of the light modulation portion is at a high level, so as to achieve a better sharing effect. At the viewing angle of 45 degrees, the light transmittance of the light modulation portion in the sharing state is 20-30 times, such as 25 times, the light transmittance of the light modulation portion in the peep-proof state. In the embodiment of the present disclosure, by setting the light modulation microstructure in the light modulation portion, the viewing angle effect that can only be achieved by adopting a higher driving voltage (e.g., 12V) required by a light modulation portion without the light modulation microstructure can be achieved by adopting a lower driving voltage (e.g., 6V), which is helpful to reduce power consumption, reduce the selection difficulty and component area of the printed circuit board assembly (PCBA) used in the driving circuit, and provides a basis for the continuous improvement of the subsequent sharing state parameters.

For example, in the case where the shape of the electrode shown in FIG. 27 is adopted, upon a driving voltage of 4.5~7V, such as 5V~6V, being applied to the electrode layer, in the Z direction, as the viewing angle of the viewer changes from 0 degree to 45 degrees, the light transmittance of the light modulation portion is at a high level, so as to achieve a better sharing effect. At the viewing angle of 45 degrees, the light transmittance of the light modulation portion in the sharing state is 5-10 times, such as 6 times, the light transmittance of the light modulation portion in the peep-proof state. In the embodiment of the present disclosure, the light modulation microstructure is set in the light modulation portion, and by adopting a lower driving voltage (e.g., 5V), not only a better display effect of switching between the peep-proof state and the sharing state in one direction can be achieved, but also a display effect of switching between the peep-proof state and the sharing state in the other direction can be improved, thus achieving the display effect of four-sided peep-proof state and sharing state.

Similarly, the shape of the electrode shown in FIG. 28, by adopting a lower driving voltage, can not only achieve a better display effect of switching between the peep-proof state and the sharing state in one direction, but also improve the display effect of switching between the peep-proof state and the sharing state in the other direction, so as to realize the display effect of four-sided peep-proof state and sharing state.

Figure 29:
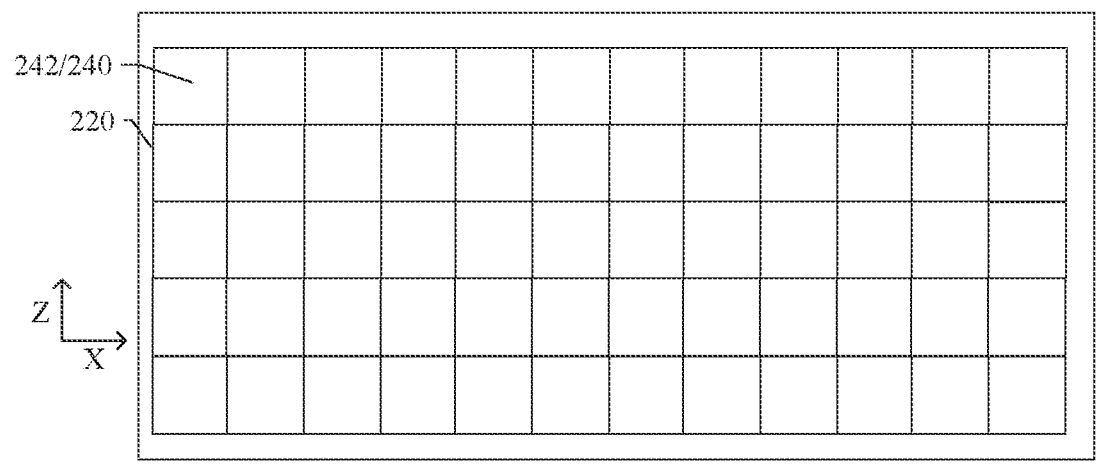
FIGS. 29 and 30 are partial structural views of a light modulation portion provided by another example of the embodiment of the present disclosure.
Figure 30:
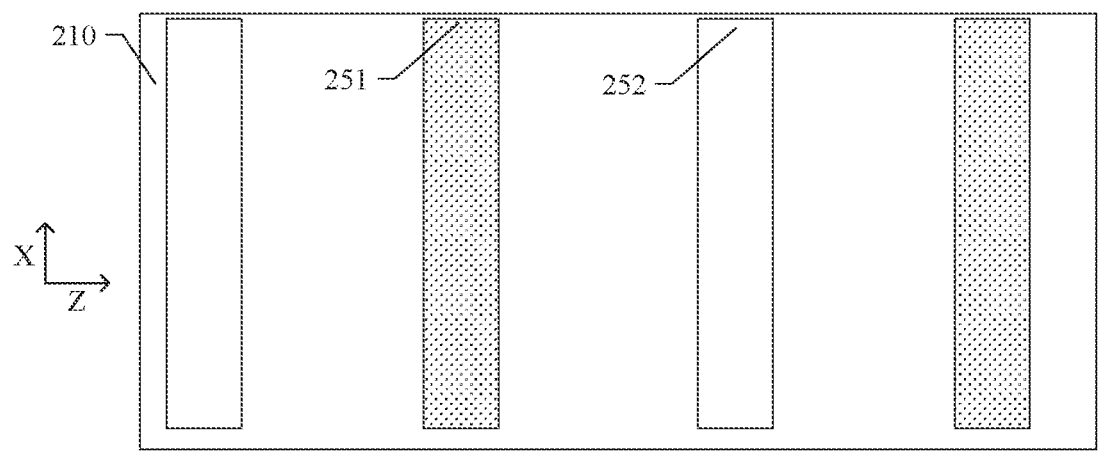

FIGS. 29 and 30 are partial structural views of a light modulation portion provided by another example of the embodiment of the present disclosure. The light modulation portion in the example shown in FIGS. 29 and 30 is different from the light modulation portion in the example shown in FIG. 6 in that: the light modulation microstructure 240 includes a plurality of light modulation blocks 242 arranged in an array along a first direction and a second direction; the plurality of electrodes include a plurality of first electrodes 251, and the plurality of electrodes further include a plurality of second electrodes 252, the plurality of first electrodes 251 and the plurality of second electrodes 252 are alternately arranged along the first direction or the second direction, and the plurality of first electrodes 251 and the plurality of second electrodes 252 are configured to input different voltages. In the present example, except that the structure and arrangement rule of the light modulation microstructure are different from those of the light modulation microstructure in the above examples, the distribution rule of the electrodes in the electrode layer can be the same as the distribution rule of the electrodes shown in FIGS. 6-11, the shapes of the electrodes can also be the same as the shapes of the electrodes shown in FIGS. 27 and 28, and details will not repeated here.

In the present example, the light modulation microstructure is set as a plurality of light modulation blocks arranged in an array, and the electrode layer includes a plurality of electrodes located in the same layer and separated from each other, so that a better display effect of sharing state and peep-proof state can be achieved under the condition of adopting a lower driving voltage, and at the same time, a display effect of switching between multilateral sharing state and peep-proof state, such as a display effect of switching between full viewing angle sharing state and peep-proof state, can be achieved.

In some examples, the light modulation microstructure includes a plurality of light modulation blocks arranged in an array along a first direction and a second direction; the electrode layer includes a first electrode layer and a second electrode layer, one of the first electrode layer and the second electrode layer is located at one side of the light modulation microstructure away from the refractive index variable material layer, the other of the first electrode layer and the second electrode layer is located at one side of the refractive index variable material layer away from the light modulation microstructure, at least one of the first electrode layer and the second electrode layer includes a plurality of electrodes located in the same layer and separated from each other, and the first electrode layer and the second electrode layer are configured to input different voltages. The light modulation microstructure in the present example can include a plurality of light modulation blocks 242 as shown in FIG. 29, and the features of the electrode layer in the present example can be the same as the features of the electrode layer in the examples shown in FIGS. 23-28, and details will not be repeated here.

In the present example, the light modulation microstructure is set as a plurality of light modulation blocks arranged in an array, and the electrode layer includes a plurality of electrodes located in the same layer and separated from each other, so that a better display effect of sharing state and peep-proof state can be achieved under the condition of adopting a lower driving voltage, and at the same time, a display effect of switching between multilateral sharing state and peep-proof state, such as a display effect of switching between full viewing angle sharing state and peep-proof state, can be achieved.

Figure 31:
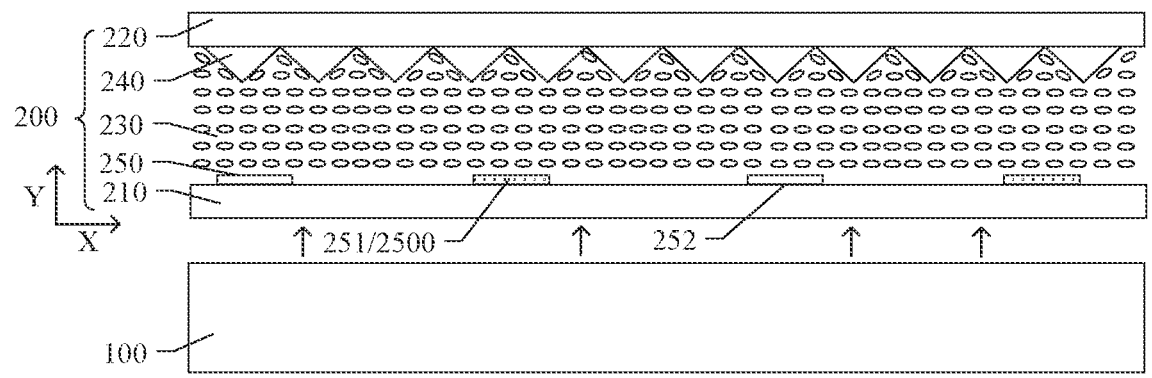
FIG. 31 is a partial structural view of a display device provided by another example of the embodiment of the present disclosure.

FIG. 31 is a partial structural view of a display device provided by another example of the embodiment of the present disclosure. In the display device in the present example, the display panel 100 is located at the light incident side of the light modulation portion 200, and the display panel 100 includes an organic light emitting diode display panel or a liquid crystal display panel.

The light modulation portion in the present example can be the same as any of the light modulation portions in the examples shown in FIGS. 6-30, and details will not be repeated here.

Figure 32:
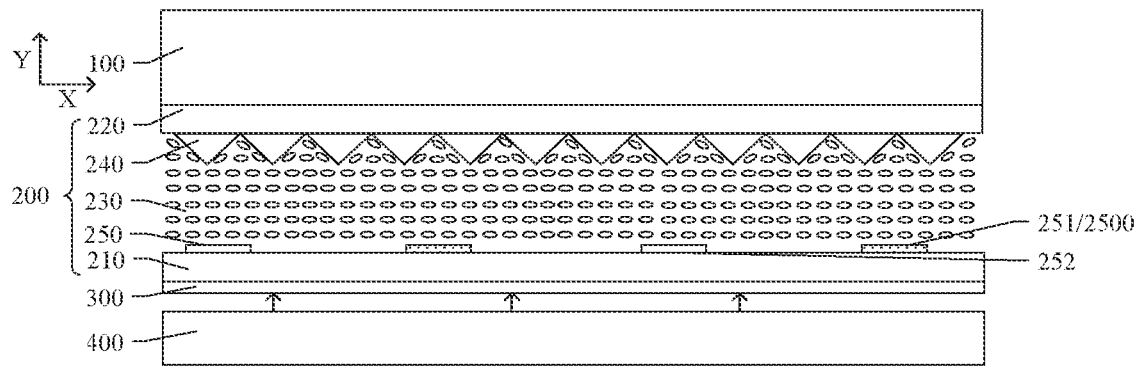
FIG. 32 is a partial structural view of a display device provided by another example of the embodiment of the present disclosure.

FIG. 32 is a partial structural view of a display device provided by another example of the embodiment of the present disclosure. The display panel 100 and the light modulation portion 200 in the display device shown in the present example can have the features as described in any of the above examples or have the combination of the features in the above examples, and details will not be repeated here.

Figure 33:
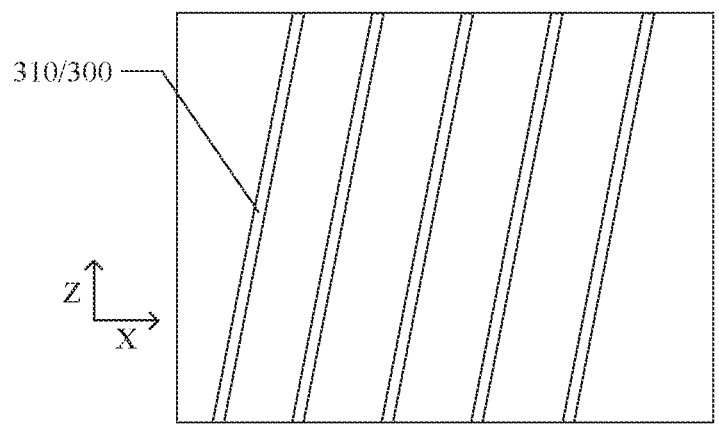
FIG. 33 is a partial planar structural view of a peep-proof structure in the display device shown in FIG. 32.

FIG. 33 is a partial planar structural view of a peep-proof structure in the display device shown in FIG. 32.

In some examples, as shown in FIGS. 32 and 33, the display device further includes a peep-proof structure 300 located at the light incident side of the light modulation portion 200, and the peep-proof structure 300 includes a plurality of strip-shaped portions 310 arranged in parallel.

For example, a backlight 400 is provided at the light incident side of the light modulation portion 200, the peep-proof structure 300 is disposed between the backlight 400 and the light modulation portion 200, and the peep-proof structure 300 can further improve the collimation of collimated light emitted by the backlight.

For example, the peep-proof structure 300 can be arranged in a louver structure by using a black material.

In some examples, as shown in FIGS. 32 and 33, the display panel 100 includes a display surface (e.g., the display surface 101 shown in FIG. 14), the shape of the display surface includes a rectangular shape, and the rectangular shape comprises two sides extending along a third direction and two sides extending along a fourth direction. Here, the third direction and the fourth direction can be the first direction and the second direction respectively, and for example, one of the third direction and the fourth direction is the X direction and the other of the third direction and the fourth direction is the Z direction.

In some examples, as shown in FIG. 33, the included angle between the extending direction of each strip-shaped portion 310 and the third direction is in the range of 5-50 degrees.

In some examples, the sides extending along the third direction is the short sides of the display surface, and for example, the third direction can be the Z direction shown in FIG. 14, and the fourth direction can be the X direction shown in FIG. 14.

The extending direction of the strip-shaped portion in the peep-proof structure is set to be non-parallel to the extending direction of the side of the display surface, for example, rotated by a certain angle relative to the extending direction of the side of the display surface, and it is helpful to improve the moire problem that is easy to occur in the laminated structure of the liquid crystal display panel and the light modulation portion.

For example, the included angle between the extending direction of the strip-shaped portion 310 and the third direction can be in the range of 7-45 degrees, such as 8-40 degrees, such as 9-35 degrees, such as 10-30 degrees, such as 15-25 degrees, such as 20-23 degrees, etc.

For example, by setting the included angle between the extending direction of the strip-shaped portion 310 and the third direction to be greater than or equal to 7 degrees, the brightness difference in the peep-proof state can be in the range of 0.015%~0.5%, and the brightness difference in the sharing state can be in the range of 0.3%~6%, upon the viewing angle of the user being plus or minus 45 degrees in the horizontal direction (X direction in the figure); and the brightness difference in the peep-proof state can be in the range of 0.015%~2%, and the brightness difference in the sharing state can be in the range of 0.3%~6%, upon the viewing angle of the user being plus or minus 45 degrees in the vertical direction (Z direction in the figure).

For example, in the case where the included angle between the extending direction of the strip-shaped portion 310 and the third direction is set to 7 degrees, when the display device is in the sharing state: the brightness (e.g., the central brightness) at the normal line in the horizontal direction of the display surface is 518.3 LumW(cd/m$^2$), the brightness is 41.13 LumW(cd/m$^2$) upon the viewing angle of the user being-45 degrees, the brightness is 63.2 LumW(cd/m$^2$) upon the viewing angle of the user being 45 degrees, and the brightness difference between the two viewing angles is 4.26%; the brightness (e.g., the central brightness) at the normal line in the vertical direction of the display surface is 467.9 LumW(cd/m$^2$), the brightness is 105.3 LumW(cd/m$^2$) upon the viewing angle of the user being-45 degrees, the brightness is 99.26 LumW(cd/m$^2$) upon the viewing angle of the user being 45 degrees, and the brightness difference between the two viewing angles is 1.29%. In the case where the included angle between the extending direction of the strip-shaped portion 310 and the third direction is set to 7 degrees, when the display device is in the peep-proof state: the brightness (e.g., the central brightness) at the normal line in the horizontal direction of the display surface is 638 LumW(cd/m$^2$), the brightness is 5.143 LumW(cd/m$^2$) upon the viewing angle of the user being-45 degrees, the brightness is 6.886 LumW(cd/m$^2$) upon the viewing angle of the user being 45 degrees, and the brightness difference between the two viewing angles is 0.27%; the brightness (e.g., the central brightness) at the normal line in the vertical direction of the display surface is 567 LumW(cd/m$^2$), the brightness is 103.5 LumW(cd/m$^2$) upon the viewing angle of the user being −45 degrees, the brightness is 100.8 LumW(cd/m$^2$) upon the viewing angle of the user being 45 degrees, and the brightness difference between the two viewing angles is 0.48%.

For example, in the case where the included angle between the extending direction of the strip-shaped portion 310 and the third direction is set to 7 degrees, when the display device is in the sharing state: the brightness (e.g., the central brightness) at the normal line in the horizontal direction of the display surface is 522.6 LumW(cd/m$^2$), the brightness is 44.82 LumW(cd/m$^2$) upon the viewing angle of the user being-45 degrees, the brightness is 63.64 LumW (cd/m$^2$) upon the viewing angle of the user being 45 degrees, and the brightness difference between the two viewing angles is 3.6%; the brightness (e.g., the central brightness) at the normal line in the vertical direction of the display surface is 480.8 LumW(cd/m$^2$), the brightness is 110.4 LumW(cd/m$^2$) upon the viewing angle of the user being-45 degrees, the brightness is 103 LumW(cd/m$^2$) upon the viewing angle of the user being 45 degrees, and the brightness difference between the two viewing angles is 1.54%. In the case where the included angle between the extending direction of the strip-shaped portion 310 and the third direction is set to 7 degrees, when the display device is in the peep-proof state: the brightness (e.g., the central brightness) at the normal line in the horizontal direction of the display surface is 640.7 LumW(cd/m$^2$), the brightness is 5.547 LumW(cd/m$^2$) upon the viewing angle of the user being-45 degrees, the brightness is 7.214 LumW(cd/m$^2$) upon the viewing angle of the user being 45 degrees, and the brightness difference between the two viewing angles is 0.26%; the brightness (e.g., the central brightness) at the normal line in the vertical direction of the display surface is 582.5 LumW(cd/m$^2$), the brightness is 108.8 LumW(cd/m$^2$) upon the viewing angle of the user being-45 degrees, the brightness is 105.8 LumW(cd/m$^2$) upon the viewing angle of the user being 45 degrees, and the brightness difference between the two viewing angles is 0.52%.

For example, in the case where the included angle between the extending direction of the strip-shaped portion 310 and the third direction is set to 7 degrees, when the display device is in the sharing state: the brightness (e.g., the central brightness) at the normal line in the horizontal direction of the display surface is 498.9 LumW(cd/m$^2$), the brightness is 41.62 LumW(cd/m$^2$) upon the viewing angle of the user being-45 degrees, the brightness is 66.98 LumW (cd/m$^2$) upon the viewing angle of the user being 45 degrees, and the brightness difference between the two viewing angles is 5.08%; the brightness (e.g., the central brightness) at the normal line in the vertical direction of the display surface is 451.2 LumW(cd/m$^2$), the brightness is 101.9 LumW(cd/m$^2$) upon the viewing angle of the user being-45 degrees, the brightness is 96.52 LumW(cd/m$^2$) upon the viewing angle of the user being 45 degrees, and the brightness difference between the two viewing angles is 1.19%. In the case where the included angle between the extending direction of the strip-shaped portion 310 and the third direction is set to 7 degrees, when the display device is in the peep-proof state: the brightness (e.g., the central brightness) at the normal line in the horizontal direction of the display surface is 619.2 LumW(cd/m²), the brightness is 5.002 LumW(cd/m²) upon the viewing angle of the user being-45 degrees, the brightness is 7.074 LumW(cd/m²) upon the viewing angle of the user being 45 degrees, and the brightness difference between the two viewing angles is 0.33%; the brightness (e.g., the central brightness) at the normal line in the vertical direction of the display surface is 553.4 LumW(cd/m²), the brightness is 98.68 LumW(cd/m²) upon the viewing angle of the user being-45 degrees, the brightness is 97.43 LumW(cd/m²) upon the viewing angle of the user being 45 degrees, and the brightness difference between the two viewing angles is 0.23%.

In the embodiment of the present disclosure, the included angle between the striped-shaped portion of the peep-proof structure and the third direction is set to be greater than or equal to 7 degrees, so that the moire can be reduced, and at the same time, the brightness difference in the peep-proof state and the brightness difference in the sharing state are both small when the viewing angle of the user is plus or minus 45 degrees.

Figure 34:
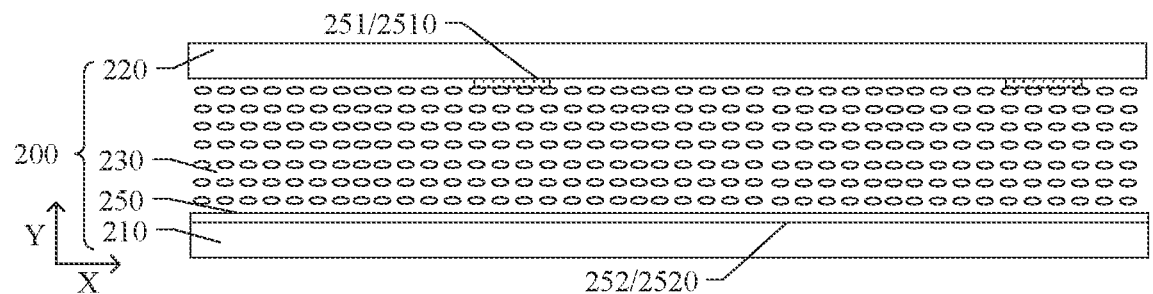
FIG. 34 is a schematic diagram of a light modulation portion provided by another example of the present disclosure.

FIG. 34 is a schematic diagram of a light modulation portion provided by another example of the present disclosure. This light modulation portion is different from the light modulation portion shown in FIGS. 24-26 in that the light modulation portion in the present example does not include a light modulation microstructure, but only includes two electrode layers as shown in FIGS. 24-26. For example, as shown in FIG. 34, the first electrode layer 2510 includes a plurality of first electrodes 251 separated from each other, the second electrode layer 2520 includes a plurality of second electrodes 252 separated from each other, and the arrangement direction of the plurality of first electrodes 251 is intersected with the arrangement direction of the plurality of second electrodes 252. In the present example, the arrangement direction of the plurality of first electrodes and the arrangement direction of the plurality of second electrodes are intersected, so that a display effect of switching between multilateral sharing state and peep-proof state, such as a display effect of switching between full viewing angle sharing state and peep-proof state, can be achieved.

For example, the first electrode 251 and the second electrode 252 can be strip-shaped electrodes, and the extending direction of the first electrode 251 is intersected with the extending direction of the second electrode 252. However, it is not limited to this case, and the shapes of the first electrode and the second electrode can be folded line shapes as shown in FIG. 27 or curved line shapes as shown in FIG. 28.

For example, the line widths of the first electrode 251 and the second electrode 242 can both be in the range of 1.5-3 microns, such as 2 microns. For example, the distance between adjacent first electrodes 251 can be in the range of 8-12 microns, such as 9-11 microns, such as 10 microns. For example, the distance between adjacent second electrodes 252 can be in the range of 8-12 microns, such as 9-11 microns, such as 10 microns.

In some embodiments, the display device provided by the embodiments of the present disclosure can be any product or component having display function, such as a mobile phone, a tablet computer, a television, a monitor, a notebook computer, a digital photo frame, a navigator, a smart watch, a fitness wristband, a personal digital assistant, etc. The display device includes, but is not limited to, a RF (Radio Frequency) unit, a network module, an audio output & input unit, a sensor, a user input unit, an interface unit, a memory, a processor, a power supply, and so on. In addition, those skilled in the art can understand that the above-mentioned structures do not constitute a limitation to the above-mentioned display device provided by the embodiments of the present disclosure. In other words, the above-mentioned display device provided by the embodiments of the present disclosure can include more or less components, or combine some components, or have different component arrangements.

The following statements should be noted:

(1) In the accompanying drawings of the embodiments of the present disclosure, the drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto, and the protection scope of the present disclosure should be based on the protection scope of the claims.

The invention claimed is:

1. A peep-proof display device, comprising:
a display panel;
a light modulation portion, disposed in a stacked manner with the display panel,
wherein the light modulation portion comprises a first substrate, a refractive index variable material layer, a light modulation microstructure, an electrode layer and a second substrate which are stacked, and the refractive index variable material layer, the light modulation microstructure and the electrode layer are all located between the first substrate and the second substrate;
the electrode layer comprises a first electrode layer and a second electrode layer respectively located at both sides of the refractive index variable material layer, the first electrode layer and the second electrode layer are configured to input different voltages, the first electrode layer comprises a plurality of first electrodes separated from each other, the second electrode layer comprises a plurality of second electrodes separated from each other, and an arrangement direction of the plurality of first electrodes and an arrangement direction of the plurality of second electrodes intersect;
wherein the light modulation microstructure comprises a plurality of light modulation columns extending along a first direction and arranged only along a second direction, the first electrode layer and the light modulation microstructure are located at one side of the refractive index variable material layer, and the second electrode layer is located at the other side of the refractive index variable material layer, the arrangement direction of the plurality of first electrodes is the same as an arrangement direction of the plurality of light modulation columns, and the arrangement direction of the plurality of second electrodes is intersected with the arrangement direction of the plurality of light modulation columns.

2. The peep-proof display device according to claim 1, wherein the plurality of light modulation columns are densely arranged.

3. The peep-proof display device according to claim 1, wherein a cross section of at least one light modulation column, which is taken by a plane parallel to the second direction and perpendicular to the first substrate, comprises a triangular shape, a trapezoidal shape, or an arc shape, and along a direction pointing from a center of the light modulation microstructure to a center of the refractive index variable material layer, a size of the cross section in a direction parallel to the first substrate gradually decreases.

4. The peep-proof display device according to claim 1, wherein the display panel comprises a display surface, a shape of the display surface comprises a rectangular shape, and the rectangular shape comprises two sides extending along the first direction and two sides extending along the second direction.

5. The peep-proof display device according to claim 1, wherein the display panel is located at a light exiting side of the light modulation portion, and the display panel comprises a liquid crystal display panel;

the display panel comprises a display surface, a shape of the display surface comprises a rectangular shape, and the rectangular shape comprises two sides extending along a third direction and two sides extending along a fourth direction; and the display device further comprises a peep-proof structure located at a light incident side of the light modulation portion, the peep-proof structure comprises a plurality of strip-shaped portions arranged in parallel, and an included angle between an extending direction of each strip-shaped portion of the plurality of strip-shaped portions and the third direction is in a range of 5-50 degrees.

6. The peep-proof display device according to claim 5, wherein the sides extending along the third direction are short sides of the display surface.

7. The peep-proof display device according to claim 1, wherein the display panel is located at a light incident side of the light modulation portion, and the display panel comprises an organic light emitting diode display panel or a liquid crystal display panel.

8. The peep-proof display device according to claim 1, wherein shapes of at least certain electrodes among the plurality of first electrodes and the plurality of second electrodes comprise a folded line shape or a wavy line shape.

9. The peep-proof display device according to claim 8, wherein both the plurality of first electrodes and the plurality of second electrodes are in the folded line shape, and an included angle between two connected line segments of a folded line is in a range of 60-90 degrees.

10. The peep-proof display device according to claim 1, wherein a refractive index of liquid crystal in the liquid crystal layer is configured to change between a first refractive index and a second refractive index, and a refractive index of the light modulation microstructure is equal to one of the first refractive index and the second refractive index.

* * * * *